(12) United States Patent
Cho et al.

(10) Patent No.: US 9,639,921 B2
(45) Date of Patent: May 2, 2017

(54) APPARATUS AND METHOD OF EXTRACTING KEYPOINT AND IMAGE MATCHING SYSTEM FOR ANALYZING DISTRIBUTION STATE OF CONTENTS USING THE SAME

(71) Applicant: CK&B Co., Ltd., Seoul (KR)

(72) Inventors: In Je Cho, Seoul (KR); Ki Hyeok Bae, Seoul (KR)

(73) Assignee: CK&B CO., LTD., Seoul (KR)

( * ) Notice: Subject to any disclaimer, the term of this patent is extended or adjusted under 35 U.S.C. 154(b) by 58 days.

(21) Appl. No.: 14/721,400

(22) Filed: May 26, 2015

(65) Prior Publication Data

US 2016/0292887 A1  Oct. 6, 2016

(30) Foreign Application Priority Data

Apr. 1, 2015 (KR) .......................... 10-2015-0046265

(51) Int. Cl.
*G06K 9/62* (2006.01)
*G06T 5/00* (2006.01)
*G06T 7/90* (2017.01)

(52) U.S. Cl.
CPC ............ *G06T 5/007* (2013.01); *G06T 7/90* (2017.01); *G06T 2207/10024* (2013.01); *G06T 2207/20024* (2013.01)

(58) Field of Classification Search
None
See application file for complete search history.

(56) References Cited

U.S. PATENT DOCUMENTS

| 8,798,362 | B2* | 8/2014 | Wang | G06F 17/3025 382/165 |
| 9,330,307 | B2* | 5/2016 | Litvak | G06K 9/00382 |
| 2006/0171594 | A1* | 8/2006 | Avidan | G06K 9/38 382/224 |
| 2008/0187220 | A1* | 8/2008 | Doretto | G06K 9/4647 382/173 |
| 2009/0022472 | A1* | 1/2009 | Bronstein | G06K 9/00751 386/278 |

(Continued)

FOREIGN PATENT DOCUMENTS

| KR | 10-2000-0021796 A | 4/2000 |
| KR | 10-0785339 B1 | 12/2007 |

(Continued)

OTHER PUBLICATIONS

Grauman, K., & Leibe, B. (2011). Visual Object Recognition. Morgan & Claypool, San Francisco.*

(Continued)

*Primary Examiner* — Andrae S Allison
(74) *Attorney, Agent, or Firm* — The PL Law Group, PLLC

(57) ABSTRACT

A device and method of extracting a keypoint, and an image matching system for analyzing an online distribution situation of contents using the same are provided. The device for extracting a keypoint which is robust to image change, includes: a keypoint extraction unit configured to extract a corner region in an image as a keypoint candidate region, and extract the keypoint from the keypoint candidate region; and a keypoint postprocessing unit configured to generate a keypoint descriptor with respect to the extracted keypoint.

29 Claims, 11 Drawing Sheets

(56) References Cited

U.S. PATENT DOCUMENTS

| | | | | |
|---|---|---|---|---|
| 2010/0284577 A1* | 11/2010 | Hua | ................... | G06K 9/00281 |
| | | | | 382/118 |
| 2013/0223749 A1* | 8/2013 | Na | ....................... | G06K 9/4676 |
| | | | | 382/201 |
| 2013/0236089 A1* | 9/2013 | Litvak | ................ | G06K 9/00382 |
| | | | | 382/154 |
| 2013/0340000 A1* | 12/2013 | Chen | .................... | H04N 21/812 |
| | | | | 725/35 |
| 2014/0029854 A1* | 1/2014 | Lyons | ............... | G06F 17/30265 |
| | | | | 382/190 |

FOREIGN PATENT DOCUMENTS

| | | |
|---|---|---|
| KR | 10-2012-0021666 A | 3/2012 |
| KR | 10-2012-0062609 A | 6/2012 |
| KR | 10-2014-0001062 A | 1/2014 |
| KR | 10-1491461 B1 | 2/2015 |

OTHER PUBLICATIONS

Xavier Suau , Josep R. Casas , Javier Ruiz-Hidalgo, Multi-resolution illumination compensation for foreground extraction, Proceedings of the 16th IEEE international conference on Image processing, Nov. 7-10, 2009, Cairo, Egypt.*

Raissel Ramirez Orozco, Ignacio Martin, Celine Loscos, and P.-P. Vasquez. Full, High-Dynamic Range Imaging for Dynamic Scenes. Proc. SPIE, 8436, 2012.*

Office action issued on Jan. 19, 2016 from Korean Intellectual Property Office in a counterpart Korean Patent Application No. 10-2015-0046265.

* cited by examiner

X direction　　　　　XY direction

X direction　　　　　XY direction

APPARATUS AND METHOD OF EXTRACTING KEYPOINT AND IMAGE MATCHING SYSTEM FOR ANALYZING DISTRIBUTION STATE OF CONTENTS USING THE SAME

CROSS-REFERENCE TO RELATED APPLICATION

This application claims priority to and the benefit of Korean Patent Application No. 10-2015-0046265, filed on Apr. 1, 2015, the disclosure of which is incorporated herein by reference in its entirety.

BACKGROUND

1. Field of the Invention

The present invention relates to image processing technology, and more particularly, to a device and method of extracting a keypoint in an image and an image matching system for analyzing an online distribution situation of contents using the same.

2. Discussion of Related Art

Information search through the Internet is also being increased while Internet technology is developed and fields utilizing the Internet are gradually expanded. Conventional information search through the Internet was largely performed based on a text, but recently, search technology based on an image is being developed while an amount of an image or a video, etc. uploaded on the Internet is increased. However, since the amount of data which is a search target is increased in an image-based search compared with a text-based search, a search speed is decreased and search accuracy deteriorates.

That is, in the image, there is a problem in which it is difficult to search the same or a similar image due to various changes (for example, illumination change, size change, affine change, time change, etc.) generated in the image. For example, even when capturing the same object according to the lighting change when capturing an image, differences in a color may be remarkably generated. Further, when capturing the image, different images are generated when a camera is rotated or the object is rotated. Moreover, different capturing images are obtained even when capturing the same object according to a resolution and a capturing distance of the camera, and whether a zoom function of the camera is used. Accordingly, it is difficult to search the same image as or an image similar to a predetermined image, and the search accuracy deteriorates.

SUMMARY

The present invention is directed to a device and method of extracting a keypoint which is robust to image change, and an image matching system for analyzing an online distribution situation of contents using the same.

According to one aspect of the present invention, there is provided a keypoint extraction device for extracting a keypoint which is robust to image change, including: a keypoint extraction unit configured to extract a corner region in an image as a keypoint candidate region, and extract the keypoint from the keypoint candidate region; and a keypoint postprocessing unit configured to generate a keypoint descriptor with respect to the extracted keypoint.

The keypoint extraction unit may calculate a difference (change of an average value) between an average value of pixel values in a window before the window is moved in the image and an average value of the pixel values in the window after the window is moved in the image, and determine the corner region using a change amount of the average value in a direction in which the change of the average value is the greatest and a change amount of the average value in a direction in which the change of the average value is the smallest.

The keypoint extraction unit may determine that a corresponding region in the image is the corner region when the change amount of the average value in the direction in which the change of the average value is the greatest and the change amount of the average value in the direction in which the change of the average value is the smallest are more than a predetermined threshold value, respectively.

The keypoint extraction unit may extract the keypoint candidate region by applying a filter to the image while maintaining a size of the image equally and changing a size of the filter.

The keypoint extraction unit may convert the filter having a real number coefficient to a normalization filter having an integer coefficient, and extract the keypoint candidate region by applying the normalization filter to an integral image of the image while changing a size of the normalization filter.

When detecting the keypoint candidate region by applying a filter having a first size to the image, the keypoint extraction unit finally may determine that the detected keypoint candidate region is the keypoint candidate region by comparing an image in which the filter having the first size is applied to the image, and an image in which a filter having a second size smaller than the first size is applied to the image and an image in which a filter having a third size greater than the first size is applied to the image.

The keypoint postprocessing unit may arrange a main direction of the keypoint in a predetermined direction, and generate a keypoint descriptor including relation information between the keypoint and a pixel adjacent to the keypoint.

The keypoint extraction unit may extract the keypoint candidate region by applying a filter to the image while maintaining a size of the filter equally and changing a size of the image.

When the image is a color image, the keypoint extraction device may further include an image preprocessing unit configured to perform an illumination compensation operation on the color image.

The image preprocessing unit may adaptively extend a dynamic range of each color channel according to a channel rate of color channels in the color image.

The image preprocessing unit may move a pixel of each color channel by an movement parameter $\beta$ while extending the dynamic range of each color channel by an extension parameter $\alpha$ after calculating the extension parameter $\alpha$ and the movement parameter $\beta$ with respect to a color channel in which a channel rate is the greatest in the color image.

When the image is a color image, the keypoint extraction device may further include: an image preprocessing unit configured to convert a space of the image from a color space to a gray scale space.

The keypoint extraction device may further include: an image preprocessing unit configured to normalize the image as a predetermined size.

The keypoint extraction device may further include: a filtering unit configured to filter the image using a low pass filter, and transmit the filtered image to the keypoint extraction unit, and the filtering unit may apply a high frequency compensation filtering method so as to preserve the corner region in the image.

The keypoint extraction device may further include: a keypoint search unit configured to search for a keypoint which matches with a first keypoint among keypoints which are previously stored.

The keypoint search unit may compare a keypoint descriptor of the first keypoint and each of keypoint descriptors of the keypoints which are previously stored, and extract the keypoints in which similarity with the first keypoint is equal to or more than a predetermined threshold value among the keypoints which are previously stored.

The keypoint search unit may verify whether the extracted keypoint matches with the first keypoint using the following Equation 1, $$\frac{SSD(f1, f2')}{SSD(f1, f2)} \quad \text{[Equation 1]}$$

Here, SSD(f1, f2) may be a sum of squared difference (SSD) between a search request keypoint f1 and a keypoint f2 in which the similarity with the search request keypoint f1 is the greatest, and SSD(f1, f2') may be an SSD between the search request keypoint f1 and a keypoint f2' in which the similarity with the keypoint f1 is the second greatest.

According to another aspect of the present invention, there is provided a keypoint extraction method of extracting a keypoint which is robust to image change, including: extracting a corner region in an image as a keypoint candidate region, in a keypoint extraction device; and generating a keypoint descriptor with respect to the keypoint extracted in the keypoint candidate region, in the keypoint extraction device.

The extracting of the corner region in the image as the keypoint candidate region may include: calculating a difference (change of average value) between an average value of pixel values in a window before the window is moved in the image and an average value of the pixel values in the window after the window is moved in the image, in the keypoint extraction device; and determining the corner region using a change amount of the average value in a direction in which the change of the average value is the greatest and a change amount of the average value in a direction in which the change of the average value is the smallest, in the keypoint extraction device.

The determining of the corner region may include: determining that a corresponding region in the image is the corner region when the change amount of the average value in the direction in which the change of the average value is the greatest and the change amount of the average value in the direction in which the change of the average value is the smallest are more than a predetermined threshold value, respectively, in the keypoint extraction device.

The extracting of the corner region in the image as the keypoint candidate region may include: extracting the keypoint candidate region by applying a filter to the image while maintaining a size of the image equally and changing a size of the filter, in the keypoint extraction device.

The extracting of the corner region in the image as the keypoint candidate region may include: converting the filter having a real number coefficient to a normalization filter having an integer coefficient, in the keypoint extraction device; and extracting the keypoint candidate region by applying the normalization filter to an integral image of the image while changing a size of the normalization filter, in the keypoint extraction device.

The extracting of the corner region in the image as the keypoint candidate region may included: detecting the keypoint candidate region by applying a filter having a first size to the image, in the keypoint extraction device; and finally determining that the detected keypoint candidate region is the keypoint candidate region by comparing an image in which the filter having the first size is applied to the image, and an image in which a filter having a second size smaller than the first size is applied to the image and an image in which a filter having a third size greater than the first size is applied to the image, in the keypoint extraction device.

The generating of the keypoint descriptor may include: setting a main direction of the keypoint as a predetermined direction, and generating a keypoint descriptor including relation information between the keypoint and a pixel adjacent to the keypoint, in the keypoint extraction device.

The extracting of the corner region in the image as the keypoint candidate region may include: extracting the keypoint candidate region by applying a filter to the image while maintaining a size of the filter equally and changing a size of the image, in the keypoint extraction device.

When the image is a color image, before the extracting of the corner region in the image as the keypoint candidate region, the keypoint extraction method may further include performing an illumination compensation operation on the color image by adaptively extending a dynamic range of each color channel according to a channel rate of color channels in the color image, in the keypoint extraction device.

The performing of the illumination compensation operation may include: calculating an extension parameter $\alpha$ and a movement parameter $\beta$ with respect to a color channel in which the channel rate is the greatest in the color image, in the keypoint extraction device; and moving a pixel of each color channel by the movement parameter $\beta$ while extending the dynamic range of each color channel by the extension parameter $\alpha$, in the keypoint extraction device.

When the image is a color image, before the extracting of the corner region in the image as the keypoint candidate region, the keypoint extraction method may further include converting a space of the image from a color space to a gray scale space, in the keypoint extraction device.

Before the extracting of the corner region in the image as the keypoint candidate region, the keypoint extraction method may further include normalizing the image as a predetermined size, in the keypoint extraction device.

According to still another aspect of the present invention, there is provided an image matching system for analyzing an online distribution situation of contents, including: a server computing device configured to extract a corner region in an image as a keypoint candidate region, and extract and store a keypoint in the keypoint candidate region; and a user computing device configured to transmit image search basic information including the image or the keypoint extracted from the image, wherein the server computing device searches for a keypoint which matches with a search request keypoint obtained from the image search basic information among keypoints which are previously stored, and monitors the number of times of search of images corresponding to the keypoint which is previously stored.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
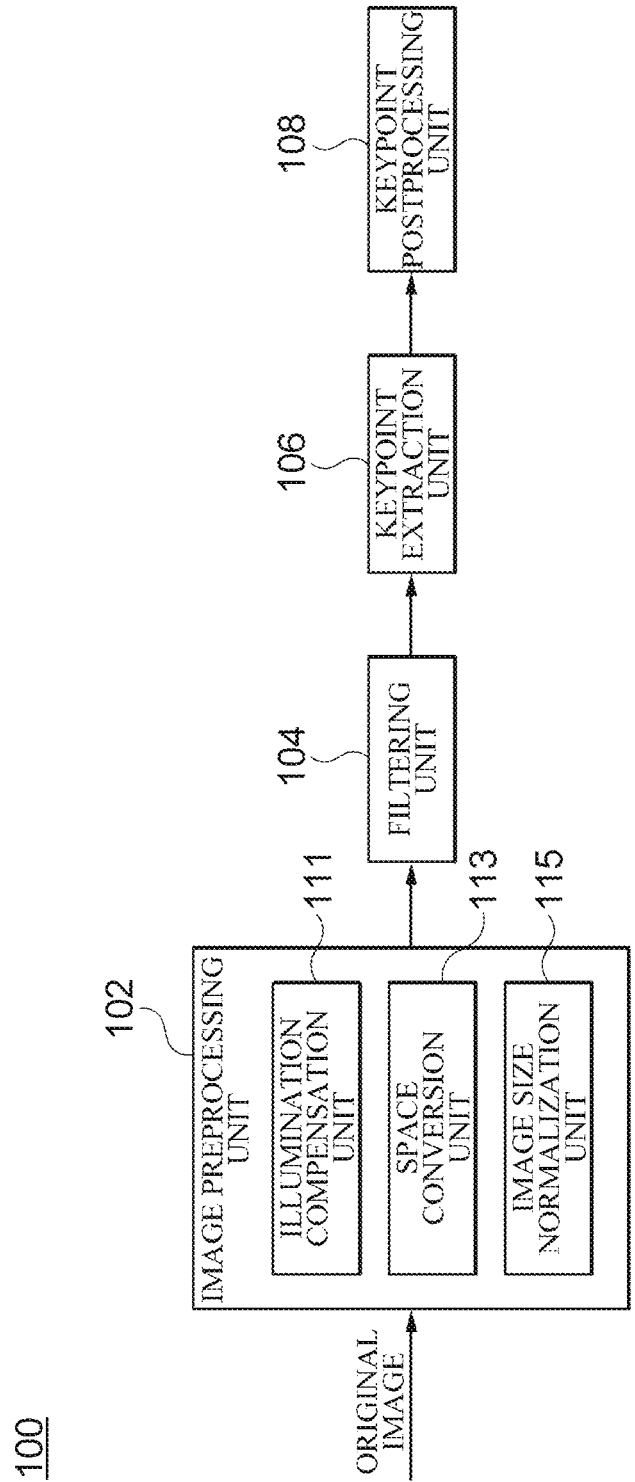
FIG. 1 is a block diagram illustrating a configuration of a device for extracting a keypoint according to an exemplary embodiment of the present invention.

Hereinafter, exemplary embodiments of the present invention will be described in detail below with reference to the accompanying drawings. A description described hereinafter is provided to help comprehensive understanding with respect to a method, a device and/or a system described in this specification. However, this is merely exemplary embodiments, and is not limited thereto.

When describing exemplary embodiments of the invention, when it is determined that a detailed description with respect to known technology related to the invention may unnecessarily obscure a gist of the present invention, a detailed description thereof will be omitted. The terminology used hereinafter is terms defined by considering a function in exemplary embodiments of the invention, and their meaning may be changed according to intentions of a user and an operator, customs, etc. Accordingly, the terminology will be defined based on the contents throughout this specification. The terminology used in the detailed description is used for describing exemplary embodiments of the invention, and is not used for limiting the invention. Elements of the invention in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

In a description described hereinafter, the terminology of "communication", "transmission", "reception", etc. and terminology similar thereto may include a meaning in which a signal or information is directly transmitted from one element to another element and is transmitted from one element to another element through an intervening element. Particularly, a meaning in which a signal or information is "transmitted" to another element may indicate a final destination of the signal or information and may not mean a direct destination. This may be equally applied with respect to a meaning of "reception" of the signal or information. Further, in this specification, a meaning in which two or more pieces of data or information are related, it may mean that at least a portion of another data (or information) may be obtained based on one data when one data (or information) is obtained.

Further, "a first" and "a second", etc. described in this specification may be intended to be termed in order to distinguish from different elements, and may not be limited to their order, and terminology of the detailed description and claims may not be identical.

Exemplary embodiments of the present invention may include technology of extracting a keypoint, and performing an image search based on the extracted keypoint. Further, exemplary embodiments may further include technology of extracting the same or a similar keypoint even when there are various changes of an image (for example, illumination change, size change, affine change, time change, etc.). That is, technology of extracting a keypoint which is robust to the image change may be included.

FIG. 1 is a block diagram illustrating a device for extracting a keypoint according to an exemplary embodiment of the present invention.

Referring to FIG. 1, a device for extracting a keypoint 100 may include an image preprocessing unit 102, a filtering unit 104, a keypoint extraction unit 106, and a keypoint post-processing unit 108.

The image preprocessing unit 102 may perform a preprocessing operation on an input image (hereinafter, it may be referred to as "an original image"). The image preprocessing unit 102 may perform the preprocessing operation so that the keypoint extraction unit 106 extracts a keypoint which is robust to illumination change when the input image is a color image. The image preprocessing unit 102 may include an illumination compensation unit 111, a space conversion unit 113, and an image size normalization unit 115.

The illumination compensation unit 111 may perform an illumination compensation operation on an input image when the input image input to the image preprocessing unit 102 is the color image. The illumination compensation unit 111 may perform the preprocessing operation on the original image by performing the illumination compensation operation before the space conversion unit 113 converts a space of the original image from a color space to a gray scale space.

The illumination compensation unit 111 may extend a dynamic range of each color channel while maintaining a channel rate by analyzing a histogram of each color channel in the original image. That is, the illumination compensation unit 111 may adaptively extend the dynamic range of each color channel according to the channel rate of each color channel in the original image. An operation in which the illumination compensation unit 111 performs the illumination compensation operation on the original image will be described in detail with reference to FIGS. 2 and 3.

Figure 2A:
FIGS. 2A to 2C are images in which an illumination compensation operation is performed on an original image (a color image)
Figure 2B:
Figure 2C:
Figure 3A:
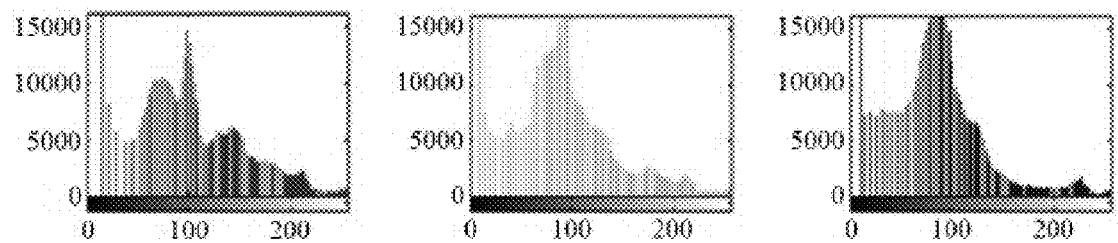
FIGS. 3A to 3C are diagrams illustrating a histogram of an image in which an illumination compensation operation is performed on each color channel of an original image (a color image)
Figure 3B:
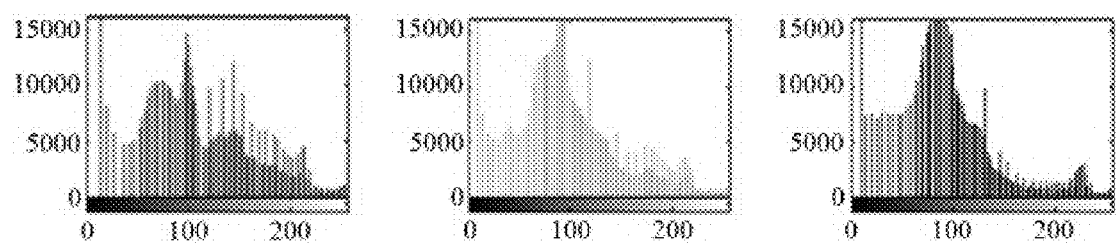
Figure 3C:
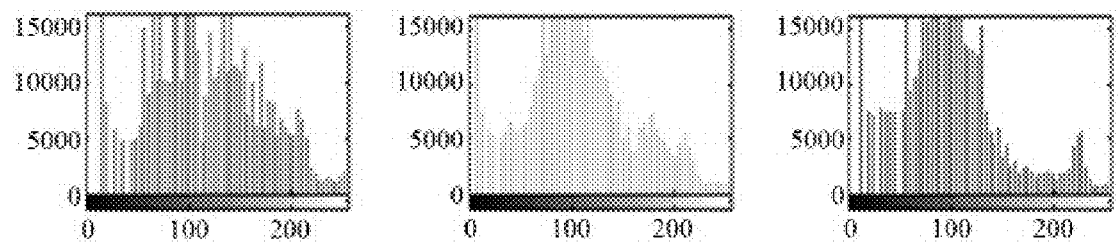

FIGS. 2A to 2C are images in which an illumination compensation operation is performed on an original image (a color image), and FIGS. 3A to 3C are diagrams illustrating a histogram of an image in which the illumination compensation operation is performed on each color channel of an original image (a color image). Particularly, FIG. 2A is a diagram illustrating the original image, FIG. 3A is a histogram illustrating distribution of pixel values of each color channel of the original image, FIG. 2B is a diagram illustrating an image in which a dynamic range for each color channel of the original image is independently extended, and FIG. 3B is a histogram illustrating distribution of pixel values of each color channel when a dynamic range of each color channel of the original image is independently extended. FIG. 2C is a diagram illustrating an image in which a dynamic range is adaptively extended according to a channel rate of each color channel of the original image, and FIG. 3C is a histogram illustrating distribution of pixel values of each color channel when a dynamic range is adaptively extended according to a channel rate of each color channel of the original image.

Referring to FIG. 2A and FIG. 3A, it may be confirmed that pixel values of a channel of each color R (red), G (green), B (blue) are not evenly distributed in a dynamic range, in an original image with lots of a yellow color or an orange color. As such, when the pixel values of each color channel are not evenly distributed in the dynamic range (that is, when the pixel values of each color channel are concentrated in a predetermined region), since there is a limit when extracting the keypoint in the image, it may be necessary to extend the dynamic range of each color channel. Here, the dynamic range may be a region in which each of pixel values of the image is distributed, and for example, the dynamic range may have a range from 0 to 255.

Referring to FIG. 2B and FIG. 3B, it may be confirmed that color characteristics of the original image is changed by performing the illumination compensation operation when extending the dynamic range of each color channel of the original image independently. That is, when changing the original image so as to be maximally and evenly distributed in the dynamic range of each color channel, it may be confirmed that the original image is changed to a faded image since a color of blue of the original image is relatively extended more.

Referring to FIG. 2C and FIG. 3C, it may be confirmed that the pixel values of each color channel are maximally and evenly distributed in the dynamic range while maintaining color characteristics of the original image (that is, while maintaining the channel rate of each color channel of the original image) by extending the dynamic range adaptively according to the channel rate of each color channel.

As such, according to an exemplary embodiment, the illumination compensation unit 111 may adaptively extend the dynamic range according to the channel rate of each color channel so that the pixel values of each color channel are maximally and evenly distributed in the dynamic range while maintaining the color characteristics of the original image.

The illumination compensation unit 111 may adaptively extend the dynamic range according to the channel rate of each color channel using a linear conversion equation shown in the following Equation 1.

$$\begin{bmatrix} \alpha \\ \beta \end{bmatrix} = \begin{bmatrix} \mu & 1 \\ \sigma & 0 \end{bmatrix}^{-1} \begin{bmatrix} \mu_{desired} \\ \sigma_{desired} \end{bmatrix}$$ [Equation 1]

Here, α represents an extension parameter, and may be a parameter representing that a dynamic range of a corresponding color of an image should be extended to some degree. β represents a movement parameter for moving every pixel value of an image according to the extension of the dynamic range of the corresponding color channel. μ represents an average pixel value of an image. σ represents standard deviation of pixel values of an image.

In an exemplary embodiment, the extension parameter α and the movement parameter β can be obtained by inputting 128 (that is, a median value in the dynamic range) in $\mu_{desired}$ and 80 in $\sigma_{desired}$ of the Equation 1.

The illumination compensation unit 111 may perform the illumination compensation operation by applying calculated extension parameter α and movement parameter β to remaining color channels after calculating the extension parameter α and the movement parameter β with respect to a color channel in which the channel rate is the greatest in the original image.

The illumination compensation unit 111 may perform the illumination compensation operation by moving the dynamic range with respect to each color channel by the extension parameter α and moving the pixel value of each color channel by the movement parameter β.

The space conversion unit 113 may perform an operation of converting a space of the original image from a color space (for example, an RGB color, a CMYK color, a YCrCb color, a YUV color, etc.) to a gray scale space when an image input to the image preprocessing unit 102 is a color image. The space conversion unit 113 may convert a space of the color image in which the illumination compensation operation is performed in the illumination compensation unit 111 from the color space to the gray scale space.

Specifically, color information of a captured image may be greatly distorted according to illumination change even when capturing the same object, location, or person. For example, differences in a color of the captured image may be remarkably generated according to capturing conditions such as a sunny day, a cloud day, a dark day, night, etc. even when capturing the same object, location, or person. Further, when the illumination changes are generated in the image in which a user performs an image processing on the captured image using Photoshop, etc., color information of the captured image may be distorted.

Accordingly, the space conversion unit 113 may convert the space of the original image from the color space to the gray scale space so that the keypoint extraction unit 106 extracts the keypoint which is robust to the illumination change.

The image size normalization unit 115 may perform an operation of normalizing a size of the image input to the image preprocessing unit 102 as a predetermined size. When the image input to the image preprocessing unit 102 is the color image, the image size normalization unit 115 may normalize a size of the image converted to the gray scale image in the space conversion unit 113 as the predetermined size. When the size of the image input to the image preprocessing unit 102 is smaller than the predetermined size, the image size normalization unit 115 may enlarge the input image to the predetermined size. When the size of the image input to the image preprocessing unit 102 is greater than the predetermined size, the image size normalization unit 115 may reduce the input image to the predetermined size.

The number of keypoints extracted from the image may be properly secured and unnecessary keypoints may be removed by normalizing the size of the image input to the image preprocessing unit 102 as the predetermined size. That is, important keypoints of the image may be extracted and the remaining keypoints excluding the important keypoints can be effectively removed by normalizing the input image as the predetermined size. In this case, in an operation of matching the keypoints, a matching speed between the keypoints can be improved while maintaining reliability of the operation of matching the keypoints at a predetermined level.

The filtering unit 104 may filter the input image. The filtering unit 104 may filter the image preprocessed in the image preprocessing unit 102. The filtering unit 104 can remove speckles or noise present in the preprocessed image by filtering the preprocessed image. For this, the filtering unit 104 may filter the preprocessed image using a Fourier-based low pass filter. However, the filtering unit 104 may apply a high frequency compensation filtering method so that a region capable of being the keypoint in the preprocessed image is not removed.

Figure 4:
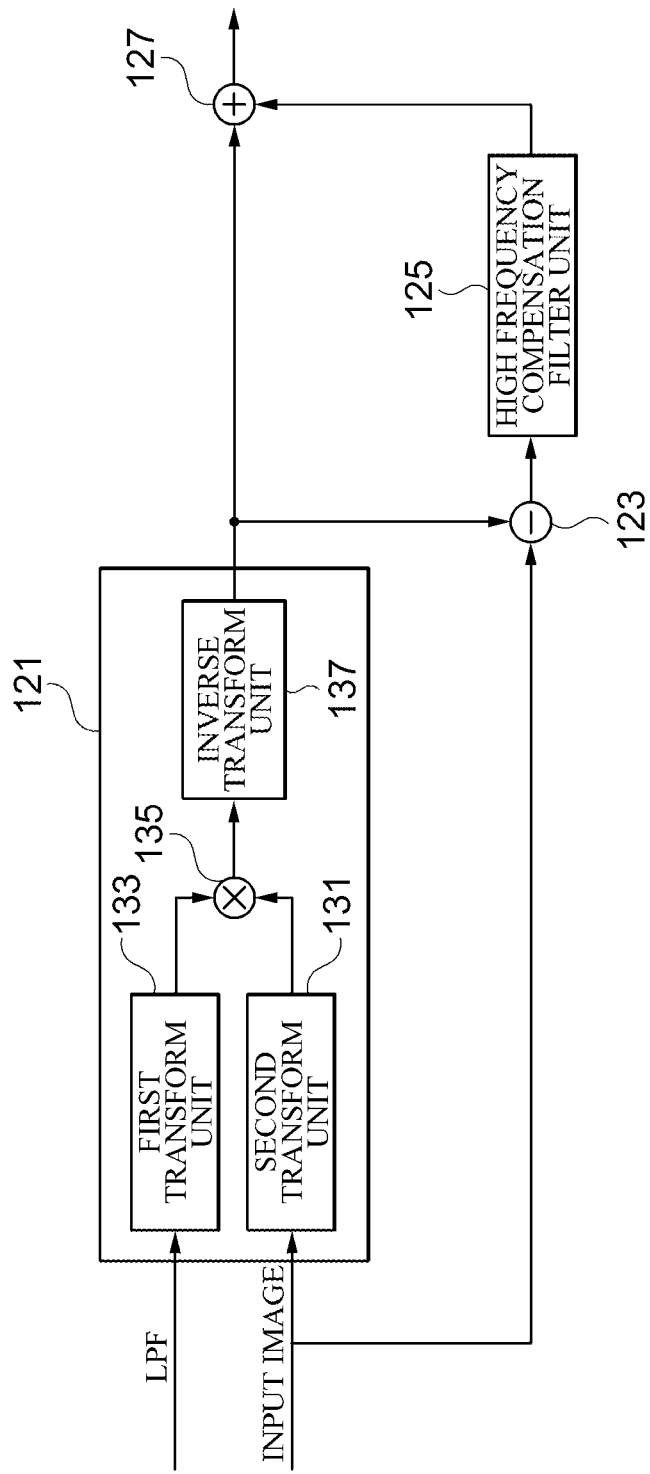
FIG. 4 is a block diagram illustrating a configuration of a filtering unit according to an exemplary embodiment of the present invention.

FIG. 4 is a block diagram illustrating a configuration of a filtering unit according to an exemplary embodiment of the present invention. Referring to FIG. 4, the filtering unit 104 may include a filter unit 121, a subtractor 123, a high frequency compensation filter unit 125, and an adder 127.

The filter unit 121 may include a first transform unit 131 transforming the input image from a space domain to a frequency domain, a second transform unit 133 transforming a low pass filter from the space domain to the frequency domain, a multiplier 135 multiplying the input image and the low pass filter which are transformed to the frequency domain, and an inverse transform unit 137 inversely-transforming an image output from the multiplier 135 from the frequency domain to the space domain. Here, the first transform unit 131 and the second transform unit 133 may perform a Fast Fourier Transform (FFT) operation. The inverse transform unit 137 may perform an Inverse Fourier Transform (IFT) operation. As such, a result which is the same as or similar to a result obtained by calculating while sliding the low pass filter by one pixel in the input image (by calculating in a convolution manner) may be obtained and a computational amount can be reduced by inversely-transforming after transforming the input image and the low pass filter from the space domain to the frequency domain.

The subtractor 123 may subtract the filtered image of the filter unit 121 from the input image. The high frequency compensation filter unit 125 may perform an operation of conserving a high frequency component (that is, a region capable of being the keypoint excluding noise) in the image output from the subtractor 123. Accordingly, a portion capable of being the keypoint may be conserved while the noise is removed through the low pass filter. Since the high frequency compensation filtering method is well known technology, a detailed description thereof will be omitted. The adder 127 may add the image filtered in the filter unit 121 and the image output from the high frequency compensation filter unit 125.

The keypoint extraction unit 106 may extract the keypoint from the input image. The keypoint extraction unit 106 may extract the keypoint from the image input from the filtering unit 104 (or the image preprocessing unit 102). The keypoint extraction unit 106 may extract a corner region of the input image as a keypoint candidate region in order to extract the keypoint which is robust to the image change (for example, rotation and movement change, etc.).

Figure 5A:
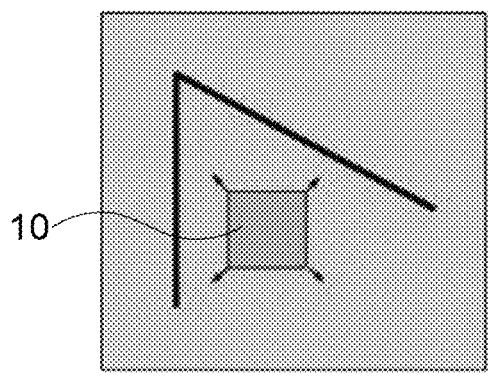
FIGS. 5A to 5C are diagrams for describing a keypoint candidate region according to an exemplary embodiment of the present invention.
Figure 5B:
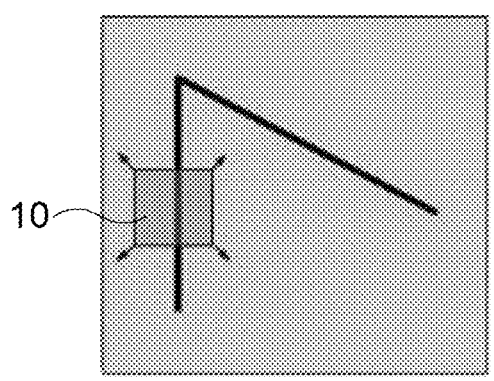
Figure 5C:
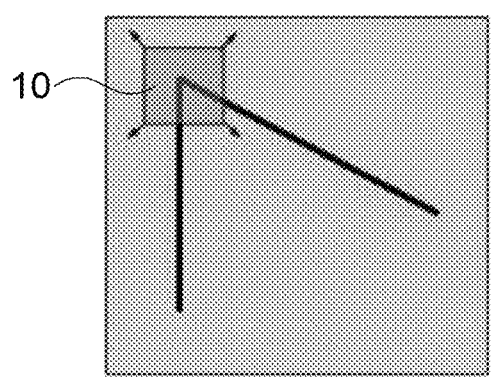

FIGS. 5A to 5C are diagrams for describing a keypoint candidate region according to an exemplary embodiment of the present invention. Referring to FIG. 5A, when minutely moving a window 10 to each direction in a region in which the window 10 of a specific size in an image is located, change of the pixel value may not be generated in every direction. This region may be referred to as a flat region.

Referring to FIG. 5B, when minutely moving the window 10 to each direction in the region in which the window 10 is located, change of the pixel value may not be generated in up and down directions. This region may be referred to as an edge region. Here, the edge region may include a region in which change of the pixel value is not generated in at least one direction as well as the up and down directions.

Referring to FIG. 5C, when minutely moving the window 10 to each direction in the region in which the window 10 is located, change of the pixel value may be generated in every direction. This region may be referred to as a corner region. In an exemplary embodiment, the keypoint extraction unit 106 may determine that the corner region is the keypoint candidate region.

The keypoint extraction unit 106 may calculate a difference (hereinafter, it may be referred to as "change of the average value") between an average value of the pixel values in the window before the window is moved in the input image and an average value of the pixel values in the window after the window is moved in the input image. Next, the keypoint extraction unit 106 may calculate a direction $\chi+$ in which the change of the average value is the greatest and a change amount $\lambda+$ of the average value in a direction in which the change of the average value is the greatest. The keypoint extraction unit 106 may calculate a direction $\chi-$ in which the change of the average value is the smallest and a change amount $\lambda-$ of the average value in a direction in which the change of the average value is the smallest. The keypoint extraction unit 106 may classify the input image into the flat region, the edge region, and the corner region using the change amount $\lambda+$ of the average value in the direction in which the change of the average value is the greatest and the change amount $\lambda-$ of the average value in the direction in which the change of the average value is the smallest.

Specifically, the keypoint extraction unit 106 may determine that a corresponding region is the flat region when there is no difference between the change amount $\lambda+$ of the average value in the direction in which the change of the average value is the greatest and the change amount $\lambda-$ of the average value in the direction in which the change of the average value is the smallest, or the difference is very small (that is, $\lambda+ \approx \lambda-$). The keypoint extraction unit 106 may determine that the corresponding region is the edge region when a difference between the change amount $\lambda+$ of the average value in the direction in which the change of the average value is the greatest and the change amount $\lambda-$ of the average value in the direction in which the change of the average value is the smallest is great (that is, $\lambda+ \gg \lambda-$). The keypoint extraction unit 106 may determine that the corresponding region is the corner region when both of the change amount $\lambda+$ of the average value in the direction in which the change of the average value is the greatest and the change amount $\lambda-$ of the average value in the direction in which the change of the average value is the smallest exceed a predetermined threshold value.

Further, the keypoint extraction unit 106 may extract the keypoint candidate region by applying the window having the same size to each input image after generating the input image as various sizes in order to extract the keypoint which is robust to the image change. Or, the keypoint extraction unit 106 may extract the keypoint candidate region by applying each window to the input image after generating the window as various sizes. That is, a curvature of the object may be changed when looking the object present in the image using the window of the same size according to the size of the image. Further, the curvature of the object present in the corresponding image may be changed according to the size of the window. Accordingly, in order to extract the keypoint which is robust to the image change such as size change and time change, etc., the keypoint extraction unit 106 may extract the keypoint candidate region by applying the window having the same size to each input image after generating the input image as various sizes or by applying each window to the input image after generating the window as various sizes. A final keypoint candidate region may be extracted by determining whether the extracted keypoint candidate regions are present in the same region of the input image.

Here, a method of applying the window having different sizes to each input image while changing the size of the window will be described. At this time, the window may be a Gaussian filter or a Laplacian filter, etc. However, since a general Gaussian filter or Laplacian filter has a real number coefficient, a computational amount may be exponentially increased as the size of the filter is increased. Accordingly, since the keypoint extraction unit 106 uses after converting a filter used for extracting the keypoint candidate region into a normalization filter having an integer coefficient, the computational amount may be prevented from increasing even when the size of the filter is increased.

Figure 6:
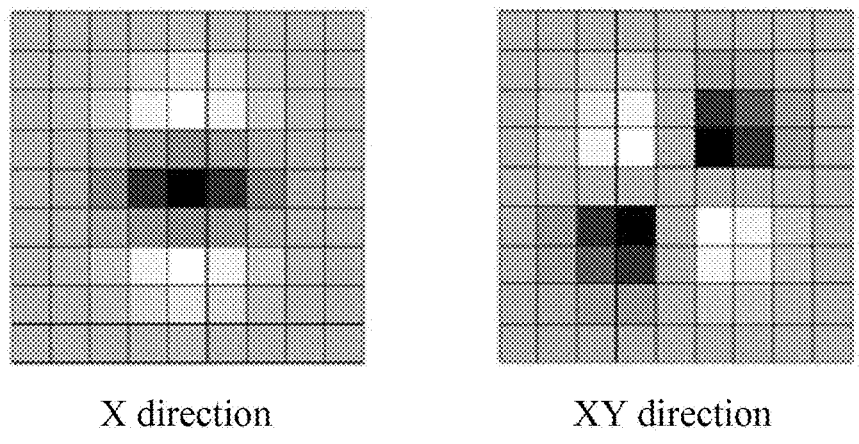
FIG. 6 is a diagram illustrating a conventional Gaussian second order derivative coefficient filter.
Figure 8:
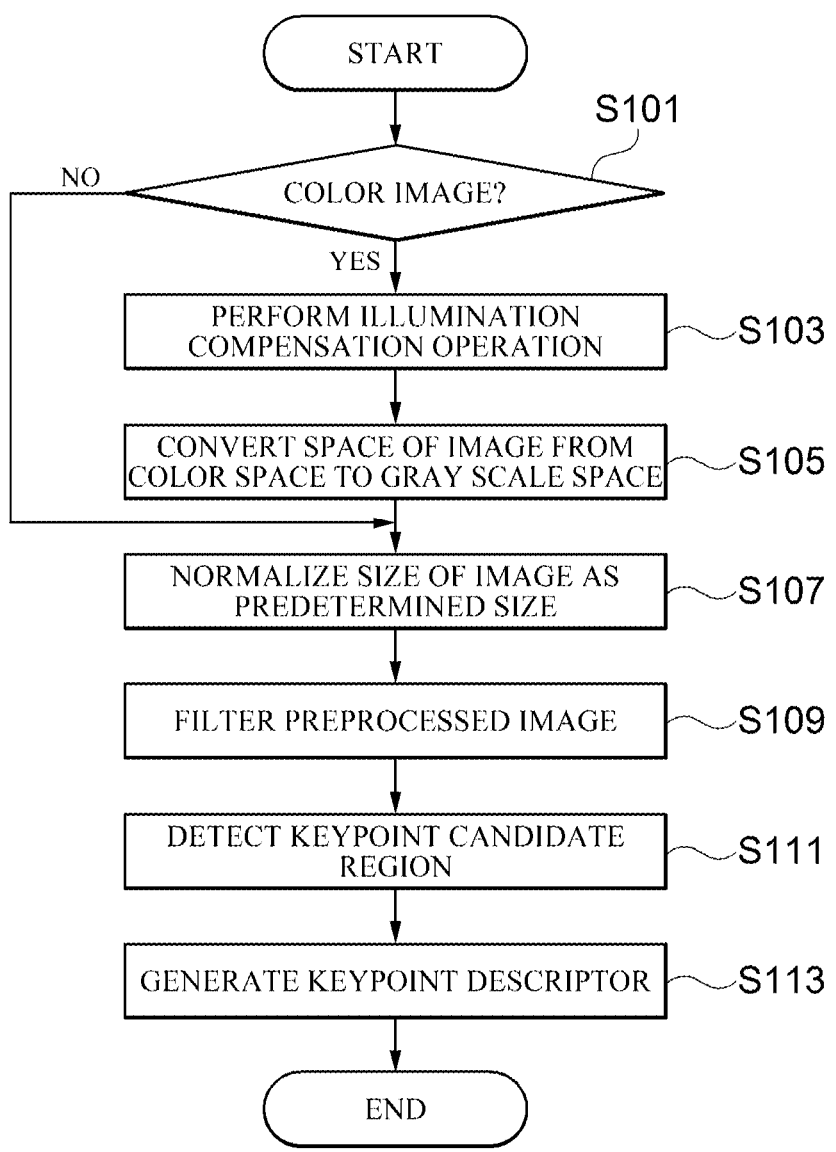
FIG. 8 is a flowchart for describing a method of extracting a keypoint according to an exemplary embodiment of the present invention.

FIG. 6 is a diagram illustrating a conventional Gaussian second order derivative coefficient filter. Here, for convenience of explanation, only filters with respect to an X direction and XY directions are illustrated. Referring to FIG. 8, since the conventional Gaussian filter applied as a filter has a different real number coefficient with respect to each pixel, a large computational amount may be needed. Here, a pixel may have a positive (+) real number coefficient as its color is bright, and a pixel may have a negative (−) real number coefficient as its color is dark.

Figure 7:
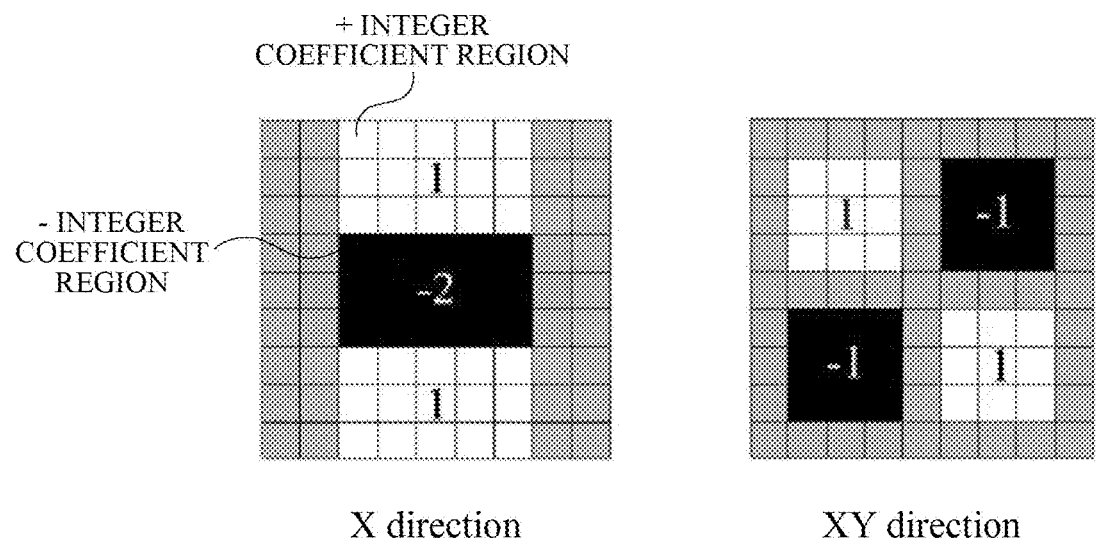
FIG. 7 is a diagram illustrating an example in which a conventional Gaussian second order derivative coefficient filter is converted into a normalization filter having an integer coefficient.

FIG. 7 is a diagram illustrating an example in which a conventional Gaussian second order derivative coefficient filter is converted into a normalization filter having an integer coefficient. Here, for convenience of explanation, only filters with respect to an X direction and XY directions are illustrated. Referring to FIG. 7, a normalization filter having an integer coefficient in which a Gaussian filter is improved may normalize a predetermined region having a positive (+) real number coefficient as a positive (+) integer coefficient region, and normalize a predetermined region having a negative (−) real number coefficient as a negative (−) integer coefficient region. Here, the normalization filter having the integer coefficient may be controlled so that a ratio of the positive (+) integer coefficient region and the negative (−) integer coefficient region is the same even when the size of the normalization filter having the integer coefficient is changed. The integer values of the positive (+) integer coefficient region and the negative (−) integer coefficient region may be properly changed at a level of those skilled in the art.

The keypoint extraction unit 106 may extract the keypoint candidate region by applying the normalization filter having the integer coefficient to an integral image after obtaining the integral image of the input image. The integral image may be an image provided so that a pixel value of a pixel corresponding to the input image has a value obtained by summing pixel values of pixels to the corresponding pixel in the input image. When using the integral image, an area of a predetermined region among the input image can be efficiently calculated. Further, the increase of the computational amount can be prevented even when several filters are applied to the integral image while increasing the size of the filter by using the normalization filter having an integer coefficient. That is, it may be possible to perform a fast calculation without being affected by the size of the filter.

Specifically, when applying a filter with respect to an X direction among the normalization filters having the integer coefficient to the integral image, a corresponding filtering value may be obtained using area values of the positive (+) integer coefficient regions (two regions) and the negative (−) integer coefficient region (one region). For example, the corresponding filtering value may be obtained by multiplying the area values of two positive (+) integer coefficient regions by 1, respectively, and multiplying the area value of the negative (−) integer coefficient region by −2. Further, when applying a filter with respect to an XY direction among the normalization filters having the integer coefficient to the integral image, the corresponding filtering value may be obtained using the area values of the positive (+) integer coefficient regions (two regions) and the area values of the negative (−) integer coefficient regions (two regions). For example, the corresponding filtering value may be obtained by multiplying the area values of two positive (+) integer coefficient regions by 1, respectively, and multiplying the area values of two negative (−) integer coefficient regions by −1, respectively.

Here, when applying each window to the input image while changing the size of the window (filter) in order to extract the keypoint which is robust to the size change, an example in which the corresponding filter is the normalization filter having the integer coefficient was described, but is not limited thereto, and the normalization filter having the integer coefficient may be also used when applying the window (filter) having the same size to each input image after generating the input image as various sizes.

The keypoint extraction unit 106 may finally determine the keypoint candidate region by comparing an image to which a filter (a first filter) of a current size (for example, a filter of 9×9 size) is applied, an image to which a filter (a second filter) (for example, a filter of 7×7 size) having a smaller size by one step than the current size is applied, and an image to which a filter (a third filter) (for example, a filter of 12×12 size) having a greater size by one step than the current size is applied when changing the size of the filter (for example, the normalization filter having the integer coefficient) while maintaining the size of the input image equally in order to extract the keypoint which is robust to the size change and the time change, etc.

Specifically, the keypoint extraction unit 106 may detect the keypoint candidate region from the input image by applying the first filter of 9×9 size to the input image. At this time, the keypoint extraction unit 106 may confirm a position of the keypoint candidate region in the image in which the first filter is applied to the input image (hereinafter, it may be referred to as "a first filter application image"). The first filter application image may be an image obtained by summing an image in which the X direction filter of the first filter is applied to the input image, an image in which the Y direction filter of the first filter is applied to the input image, and an image in which the XY direction filter of the first filter is applied to the input image. Since the size of the input image is the same, the position of the keypoint candidate region in the first filter application image may be the same as a corresponding position in the input image.

Next, the keypoint extraction unit 106 may compare a value of the keypoint candidate region of the first filter application image and values of positions corresponding to the keypoint candidate regions of the image in which the second filter of 7×7 size is applied to the input image (hereinafter, it may be referred to as "a second filter application image"), and the image in which the third filter of 12×12 size is applied to the input image (hereinafter, it may be referred to as "a third filter application image"). Here, the keypoint extraction unit 106 may determine that a corresponding keypoint candidate region is a final keypoint candidate region when a difference between the value of the keypoint candidate region of the first filter application image and the values of the keypoint candidate regions of the second filter application image and the third filter application image is equal to or more than a predetermined threshold value. The keypoint extraction unit 106 may extract the keypoint from the keypoint candidate region.

As such, when extracting the keypoint candidate region while maintaining the size of the input image equally and changing the size of the filter, it may be confirmed that the keypoint candidate region is extracted when applying a filter having which size with respect to a corresponding input image when extracting the keypoint candidate region by comparing the image (the first filter application image) to which the filter having the current size is applied, and the image (the second filter application image) to which the filter having a smaller size by one step than the filter having the current size is applied and the image (the third filter application image) to which the filter having a greater size by one step than the filter having the current size is applied.

The keypoint postprocessing unit 108 may perform a compensation operation on the keypoint information extracted by the keypoint extraction unit 106. The keypoint postprocessing unit 108 may perform the compensation operation on the keypoint information extracted by the keypoint extraction unit 106 in order to obtain the keypoint which is robust to the rotation change. The keypoint postprocessing unit 108 may include a descriptor. The descriptor may perform an operation of generating a keypoint descriptor. The keypoint descriptor may include information for describing the keypoint. For example, the keypoint descriptor may include a main direction of the keypoint, a size of the keypoint in the main direction, and relation information between the keypoint and a pixel adjacent to the keypoint, etc.

The keypoint postprocessing unit 108 may calculate the main direction of the keypoint extracted by the keypoint extraction unit 106 and the size in the main direction of the keypoint. Here, when the keypoint is extracted from the first filter application image, the keypoint postprocessing unit 108 may calculate the main direction of the keypoint and the size in the main direction of the keypoint using the second filter application image and the third filter application image. Specifically, the keypoint postprocessing unit 108 may display the keypoint and a pixel value of a region adjacent to the keypoint (hereinafter, it may be referred to as "a keypoint related region") in the first filter application image and pixel values of a region corresponding to a region related to the keypoint in the second filter application image and the third filter application image on a three-dimensional axis, and calculate the main direction of a corresponding keypoint and the size in the main direction of the keypoint by summing a vector of each pixel value based on the corresponding keypoint. The main direction of the keypoint may include a gradient and an angle.

As such, when the keypoint is extracted from the first filter application image, the main direction of the keypoint may be three-dimensionally represented by calculating the main direction of the keypoint using the second filter application image and the third filter application image. However, it is not limited thereto, and the main direction of the keypoint may be two-dimensionally represented by calculating through the keypoint related region of the first filter application image.

The keypoint postprocessing unit 108 may describe by arranging the main direction of the keypoint in a predetermined direction through the descriptor. At this time, the descriptor may generate relation information (for example, a position and a distance from the keypoint) between the keypoint and a pixel adjacent to the keypoint. The keypoint postprocessing unit 108 may describe the same keypoint in a corresponding image even when the image is rotated by arranging the main direction of the keypoint in the predetermined direction and generating the relation information between the keypoint and the pixel adjacent to the keypoint. That is, since the corresponding keypoint can be described by arranging the main direction of the keypoint in the predetermined direction even when the image is rotated and confirming the relation between the keypoint and the pixel adjacent to the keypoint using the relation information, the keypoint descriptor which is robust to the rotation change may be generated.

Meanwhile, an example in which the keypoint extraction unit 106 and the keypoint postprocessing unit 108 are separately configured was described, but is not limited thereto and the keypoint postprocessing unit 108 may be included in the keypoint extraction unit 106. Further, although not shown, the device for extracting the keypoint 100 may further include a keypoint search unit. The keypoint search unit (not shown) may search for a keypoint which matches with a first keypoint among the keypoints which are previously stored. The keypoints which are previously stored may be stored inside the device for extracting the keypoint 100 and be stored outside the device for extracting the keypoint 100. An operation related to the keypoint search will be described in an image search system which will be described hereinafter.

According to an exemplary embodiment, the keypoint which is robust to the illumination change may be extracted by adaptively extending the dynamic range of each color channel according to a channel rate of each color channel and performing a preprocessing operation of converting the input image from a color space to a gray scale space. Further, the number of the keypoints extracted from the image may be properly secured and unnecessary keypoints can be removed by performing the preprocessing operation of normalizing the input image as the predetermined size. Moreover, speckles or noise present in the input image can be removed and a portion capable of being the keypoint can be preserved by filtering the input image using a low pass filter and applying a high frequency compensation filtering method.

Further, the keypoint which is robust to the size change and the time change may be extracted by applying each window to the input image and extracting the keypoint candidate region after generating the window having various sizes. At this time, the increase of the computational amount may be prevented and a fast calculation may be performed even when the size of the filter (the window) is increased by applying the normalization filter having the integer coefficient to the integral image of the input image. Moreover, the same keypoint may be described in the corresponding image even when the image is rotated by arranging the main direction of the keypoint in the predetermined direction and generating the relation information between the keypoint and the pixel adjacent to the keypoint.

FIG. 8 is a flowchart for describing a method of extracting a keypoint according to an exemplary embodiment of the present invention. In the flowchart shown, an example in which the method of extracting the keypoint includes a plurality of operations is illustrated, but at least a portion of the operations may be performed by changing the order or combining with another operation, be omitted, or be performed by being sub-divided or by being added one or more operations which are not shown. Further, one or more operations which are not shown in the method may be performed together with the method according to an exemplary embodiment.

Referring to FIG. 8, the image preprocessing unit 102 may confirm whether an original image is a color image (S101). When the original image is the color image based on the confirmation result of the operation S101, the image preprocessing unit 102 may perform an illumination compensation operation on the original image (S103). The image preprocessing unit 102 may adaptively extend the dynamic range of each color channel according to a channel rate of each color channel in the original image. Specifically, the image preprocessing unit 102 may calculate an extension parameter α and a movement parameter β with respect to a color channel in which the channel rate is the greatest in the original image, move the dynamic range with respect to each color channel by the extension parameter α, and move the pixel value of each color channel by the movement parameter β, and thus the dynamic range of each color channel may be adaptively extended according to the channel rate of each color channel.

Next, the image preprocessing unit 102 may convert a space of the illumination compensated color image from the color space to the gray scale space (S105). Accordingly, the keypoint which is robust to the illumination change may be extracted.

Next, the image preprocessing unit 102 may normalize a size of the image which is converted to the gray scale space as a predetermined size (S107). The image preprocessing unit 102 may normalize as the predetermined size by enlarging or reducing the image which is converted to the gray scale space. Accordingly, the number of keypoints extracted from the image may be properly secured and unnecessary keypoints can be removed.

When the original image is not the color image (that is, when the original image is the gray scale image) based on the confirmation result of the operation S101, the image preprocessing unit 102 may normalize the size of the original image as the predetermined size.

Next, the filtering unit 104 may filter the image preprocessed in the image preprocessing unit 102 (S109). The filtering unit 104 may filter the preprocessed image using a low pass filter. A high frequency compensation filtering method may be applied so that a region capable of being the keypoint in the preprocessed image is not removed.

Next, the keypoint extraction unit 106 may detect the keypoint candidate region from the input image (S111). The keypoint extraction unit 106 may detect a corner region in the input image as the keypoint candidate region. The corner region in the input image may be determined by the following method. First, the keypoint extraction unit 106 may calculate a difference (hereinafter, it may be referred to as "change of an average value") between an average value of the pixel values in the window before the window is moved in the input image and an average value of the pixel values in the window after the window is moved in the input image. Next, the keypoint extraction unit 106 may calculate a direction χ+ in which the change of the average value is the greatest and the change amount λ+ of the average value in the direction in which the change of the average value is the greatest. Further, the keypoint extraction unit 106 may calculate a direction χ− in which the change of the average value is the smallest and the change amount λ− of the average value in the direction in which the change of the average value is the smallest. Next, the keypoint extraction unit 106 may detect the corner region in the input image using the change amount λ+ of the average value in the direction in which the change of the average value is the greatest and the change amount λ− of the average value in the direction in which the change of the average value is the smallest. At this time, the keypoint extraction unit 106 may determine that a corresponding region is the corner region when both of the change amount λ+ of the average value in the direction in which the change of the average value is the greatest and the change amount λ− of the average value in the direction in which the change of the average value is the smallest are more than a predetermined threshold value.

When detecting the keypoint candidate region in the input image, the keypoint extraction unit 106 may apply each window to the input image while maintaining the size of the input image equally and changing the size of the window (filter) in order to extract the keypoint which is robust to the size change and the time change, etc. Alternatively, the keypoint extraction unit 106 may apply the window (filter) having the same size to each input image while changing the size of the input image. The keypoint extraction unit 106 may extract the keypoint from the keypoint candidate region.

Next, the keypoint postprocessing unit 108 may generate the keypoint descriptor by performing the compensation operation on the keypoint extracted by the keypoint extraction unit 106 (S113). Specifically, the keypoint postprocessing unit 108 may calculate the main direction of the keypoint and the size in the main direction of the keypoint. Next, the keypoint postprocessing unit 108 may arrange the main direction of the keypoint in a predetermined direction, and generate the keypoint descriptor including the relation information between the keypoint and the pixel adjacent to the keypoint. Accordingly, the same keypoint may be described in the corresponding image even when the image is rotated.

Figure 9:
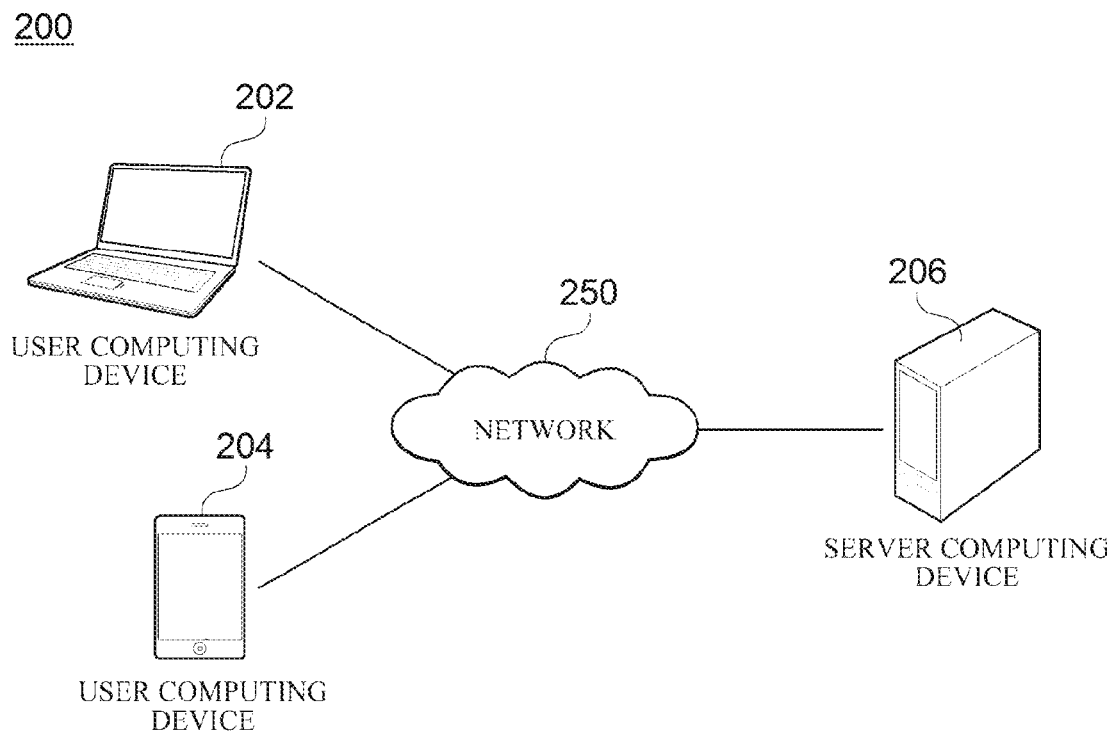
FIG. 9 is a diagram illustrating an image search system based on a keypoint according to an exemplary embodiment of the present invention.

FIG. 9 is a diagram illustrating an image search system based on a key point according to an exemplary embodiment of the present invention.

Referring to FIG. 9, an image search system 200 may include at least one user computing device (for example, user computing devices 202 and 204 shown in FIG. 9) and at least one server computing device (for example, a server computing device 206 shown in FIG. 9). As shown in FIG. 9, each of a first user computing device 202 and a second user computing device 204 may be connected to be communicable with the server computing device 206 through a network 250 such as a local area network (LAN), a wide area network (WAN), a cellular network, or the Internet. Communication between each of the user computing devices 202 and 204 and the server computing device 206 may be performed based on a conventional client/server model. Examples of the user computing devices 202 and 204 may be a mobile communication device such as a mobile phone, a smart phone, a tablet personal computer (PC), a laptop computer, etc., but are not limited thereto, and may include various types of wireless communication devices and wired communication devices capable of being connected to the server computing device 206. Examples of the server computing device 206 may include various types of server computers, for example, main frame-based or open system-based server computers.

The first user computing device 202 may be a computing device of a user for registering a predetermined image in the server computing device 206. The first user computing device 202 may transmit an image register request to the server computing device 206. The image register request may include a predetermined image and image related information (for example, image generation date, a title of a corresponding image, information with respect to contents of a corresponding image, uniform resource locator (URL) information linked to a corresponding image, product information associated with a corresponding image (a product name, a manufacturer, a related advertisement, product reviews, a retailer, etc.), information regarding whether a corresponding image is an image for advertisement, etc.). The image register request may include a plurality of images. The user may set a representative image among the plurality of images. The representative image may be an image which is displayed by priority when searching for the image of other users among the plurality of images.

The first user computing device 202 may register an image by transmitting the image stored in the memory of the first user computing device 202 to the server computing device 206, and register an image by transmitting the image obtained from another computing device to the server computing device 206. The first user computing device 202 may receive an image registration result from the server computing device 206. The first user computing device 202 may receive search history information with respect to the registered image from the server computing device 206. The first user computing device 202 may search for whether an image which is the same as or similar to the corresponding image is previously registered when registering the predetermined image.

The second user computing device 204 may be a computing device of a user for searching for at least one among the predetermined image and the image related information through the server computing device 206. The second user computing device 204 may transmit image search basic information to the server computing device 206. The image search basic information may include at least one among the predetermined image, keypoint information extracted from the predetermined image, and image search condition. The image search condition may include search by period, search by popularity, search by the newest, whether an advertisement image is (search by classifying the advertisement image and a non-advertisement image), etc. Here, the image included in the image search basic information may be an image captured in the second user computing device 204, an image stored in the memory of the second user computing device 204, or an image obtained from another computing device. When the second user computing device 204 transmits the keypoint information extracted from a predetermined image to the server computing device 206, the second user computing device 204 may include a keypoint extractor. The keypoint extractor may be the device for extracting the keypoint 100, but is not limited thereto. The second user computing device 204 may receive at least one among the predetermined image and the image related information from the server computing device 206.

Hereinafter, for convenience of explanation, an example in which the first user computing device 202 may be a computing device of a user for registering an image, and the second user computing device 204 may be a computing device of a user for searching for the image related information will be described, but is not limited thereto, and each of the user computing devices 202 and 204 may be used for searching for the image registration and/or the image related information.

The server computing device 206 may host a web site including at least one web page. The server computing device 206 may provide a web page in which users can access in order to register the image through the network 250. The server computing device 206 may provide a web page in which the users can access in order to search for the image related information through the network 250.

The server computing device 206 may receive the image registration request from the first user computing device 202. The server computing device 206 may determine whether the image included in the image registration request is a registration-possible image. The server computing device 206 may determine that the image is a registration-impossible image when the image included in the image registration request is a harmful image (for example, an image people equal to or less than 19 years old cannot watch) or an image which cannot extract the keypoint. When it is determined that the image included in the image registration request is the registration-impossible image, the server computing device 206 may transmit a registration impossibility guide message to the first user computing device 202.

The server computing device 206 may extract the keypoint from the image included in the image registration request. The server computing device 206 may register a corresponding image in a system by matching and storing information with respect to the extracted keypoint with the image related information included in the image registration request. The server computing device 206 may transmit an image registration result to the first user computing device 202. The server computing device 206 may monitor the search history with respect to the registered image, and transmit search history information to the first user computing device 202 registering the corresponding image.

When a plurality of images are included in the image registration request, the server computing device 206 may determine whether each of the plurality of images is the registration-possible image. That is, the server computing device 206 may confirm whether each of the plurality of images is a harmful image or the keypoint can be extracted from each of the plurality of images, etc., and when all of the plurality of images are the harmful image or the images which cannot extract the keypoint, transmit the registration impossibility guide message to the first user computing device 202. When at least one of the plurality of images is the registration-possible image, the server computing device 206 may perform the image registration operation on the corresponding image. The server computing device 206 may transmit the registration impossibility guide message with respect to the remaining images (that is, the registration-impossible images) to the first user computing device 202.

When the server computing device 206 receives the image registration request, the server computing device 206 may search for whether there is an image which is previously registered by another user which is the same as or similar to the image included in the image registration request. When there is the image which is previously registered by another user and which is the same as or similar to the image included in the image registration request, the server computing device 206 may notify a corresponding fact to the first user computing device 202. At this time, the server computing device 206 may ask the first user computing device 202 about whether to register the corresponding image (that is, whether to proceed the registration operation on the corresponding image even when there is the image which is previously registered by another user and which is the same as or similar to the image included in the image registration request).

When registering the image of a predetermined user, the server computing device 206 may link images which are the same as or similar to the image which is desired to register among the images which are previously registered by other users and the image which is desired to register.

The server computing device 206 may receive the image search basic information from the second user computing device 204. When the keypoint information is included in the image search basic information, the server computing device 206 may search for the keypoint which matches with the keypoint information included in the image search basic information, and extract the image related information stored by matching with the searched keypoint. The server computing device 206 may search for the matching keypoint according to the image search condition included in the image search basic information. The server computing device 206 may transmit at least one of an image corresponding to the searched keypoint and the extracted image related information to the second user computing device 204.

When the keypoint information is not included and only the predetermined image is included in the image search basic information, the server computing device 206 may extract the keypoint from the corresponding image and search for the keypoint which matches with the extracted keypoint. The server computing device 206 may include a keypoint extractor for extracting the keypoint from the image. The keypoint extractor may be the device for extracting the keypoint 100 shown in FIG. 1, but is not limited thereto.

When searching for the image using the image or the keypoint information included in the image search basic information, the server computing device 206 may search for a plurality of images according to similarity with the image or the keypoint information included in the image search basic information. At this time, the images searched according to the similarity may be classified into a plurality of groups. For example, when the similarity is equal to or more than a first threshold value which is previously set, the corresponding searched image may be classified as a same image group, and when the similarity is equal to or more than a second threshold value which is previously set and is less than the first threshold value, the corresponding searched image may be classified as a similar image group. Here, an example in which the plurality of images are classified as the same image group or the similar image group was described, but is not limited thereto, and the plurality of images may be classified as three or more groups.

When transmitting the image and the image related information corresponding to the image search basic information to the second user computing device 204, the server computing device 206 may also transmit the image (that is, the image which is the same as or similar to the image corresponding to the image search basic information) and the image related information linked to the image corresponding to the image search basic information. For example, when an image A and image related information of the image A with respect to a user 1 are previously registered and a user 2 desires to register an image B and image related information of the image B, the server computing device 206 may link the image B and the image A similar to the image B when performing the image registration operation on the image B. Further, suppose that a user 3 transmits the image search basic information including an image C and the server computing device 206 finds the image B by searching for the image corresponding to the image C. Then, the server computing device 206 may also transmit the image A linked to the image B as well as the image B to the user 3. That is, the server computing device 206 may also transmit the image A (that is, the image similar to the B image) linked to the image B to the user 3 even when only the image B is found and the image A is not found when searching for the image corresponding to the image C.

The server computing device 206 may monitor the number of times of search with respect to each registered image. For example, the server computing device 206 may monitor at least one among the number of times of search for each period, the number of times of search for each region, the number of times of search for each age, and the total number of times of search. When transmitting the image and the image related information corresponding to the image search basic information to the second user computing device 204, the server computing device 206 may transmit the corresponding images and the image related information by arranging in a descending order according to the number of times of search. That is, the server computing device 206 may sequentially transmit from an image in which the number of times of search is the greatest to an image in which the number of times of search is the smallest. The server computing device 206 may periodically update the number of times of search with respect to each registered image.

The server computing device 206 may limit the number of times of image registration for each user. For example, the server computing device 206 may limit the number of times of image registration for one day with respect to each user. When the total number of times of search of the images registered by the predetermined user is more than the predetermined number of times of search, the server computing device 206 may operate in order to increase the number of times of image registration of the corresponding user.

Here, the server computing device 206 may be a social network service (SNS) server. The server computing device 206 may provide an image-based (more particularly, an image keypoint-based) SNS service. That is, the users of the user computing devices 202 and 204 may register the image and the image related information in their own SNS accounts which the server computing device 206 manages, and share the image and the image related information. Further, the users of the user computing devices 202 and 204 may search for the image related information other users register through the server computing device 206. As such, it may be possible to communicate with the users using a different language smoothly by providing the image-based SNS service, and it may be easy to obtain necessary information using only the image without additional information.

Figure 10:
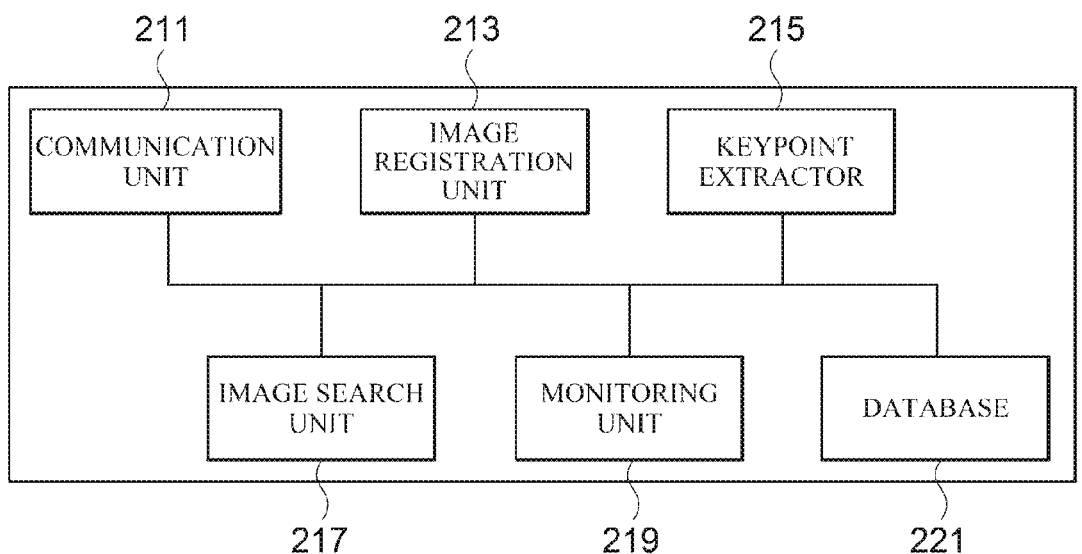
FIG. 10 is a block diagram illustrating a configuration of a server computing device according to an exemplary embodiment of the present invention.

FIG. 10 is a block diagram illustrating a configuration of a server computing device according to an exemplary embodiment of the present invention.

Referring to FIG. 10, the server computing device 206 may include a communication unit 211, an image registration unit 213, a keypoint extractor 215, an image search unit 217, a monitoring unit 219, and a database 221.

The communication unit 211 may perform communication with the user computing devices 202 and 204. The communication unit 211 may receive an image registration request from the user computing devices 202 and 204. The communication unit 211 may receive image search basic information from the user computing devices 202 and 204. The communication unit 211 may transmit an image registration result to the user computing devices 202 and 204. The communication unit 211 may transmit at least one of the image and the image related information searched based on the image search basic information to the user computing devices 202 and 204. The communication unit 211 may transmit search history information with respect to the registered image to the user computing devices 202 and 204.

The image registration unit 213 may determine whether it is possible to register with respect to the received image registration request, and perform an image registration operation or an image registration impossibility operation based on the determination result. The image registration unit 213 may determine whether it is possible to register the image and the image related information included in the image registration request. The image registration unit 213 may determine that it is not possible to register with respect to the image registration request when the image and the image related information included in the image registration request are the same as or similar to harmful contents information stored in the database 221. Further, the image registration unit 213 may determine that it is not possible to register with respect to the image registration request when it is not possible to extract the keypoint from the image included in the image registration request (for example, it is not possible to extract the keypoint since the image itself is too simple or the image is damaged, etc.). The image registration unit 213 may transmit a registration impossibility guide message to the user computing devices 202 and 204 through the communication unit 211 when it is determined that it is not possible to register with respect to the image registration request.

When it is determined that it is possible to register with respect to the image registration request, the image registration unit 213 may perform the image registration operation by matching and storing the keypoint information extracted from the image included in the image registration request with the corresponding image and the image related information. When being not included in registration impossibility reasons which are previously set, the image registration unit 213 may determine that it is possible to register with respect to the image registration request. When performing the image registration operation with respect to the image registration request, the image registration unit 213 may transmit the image registration result to the user computing devices 202 and 204 through the communication unit 211.

When the plurality of images are included in the image registration request, the image registration unit 213 may determine whether it is possible to register with respect to each of the plurality of images. When it is determined that all of the plurality of images are registration-impossible images, the image registration unit 213 may transmit the registration impossibility guide message to the user computing devices 202 and 204 through the communication unit 211. When it is determined that at least one of the plurality of images is a registration-possible image, the image registration unit 213 may perform the image registration operation on the corresponding image. Further, the image registration unit 213 may transmit the registration impossibility guide message with respect to the remaining images to the user computing devices 202 and 204 through the communication unit 211.

When registering the image of the predetermined user, the image registration unit 213 may link the images which are the same as or similar to an image which is desired to register among the images of other users which are previously registered and the image which is desired to register.

The image registration unit 213 may limit the number of times of image registration for each user. When the total number of times of search of the images in which the predetermined user registers is more than the predetermined number of times of search, the image registration unit 213 may operate so as to increase the number of times of image registration of the corresponding user.

The keypoint extractor 215 may extract the keypoint from the image included in the image registration request. The keypoint extractor 215 may extract the keypoint from the image included in the image search basic information. When the keypoint information is not included and only the image is included in the image search basic information, the keypoint extractor 215 may extract the keypoint from the corresponding image. The keypoint extractor 215 may have a configuration which is the same as or similar to the device for extracting the keypoint 100 shown in FIG. 1. In this case, the keypoint extractor 215 may extract the keypoint which is robust to image change (for example, illumination change, size change, time change, rotation change, etc.). The keypoint extractor 215 may include the keypoint extraction unit 106 of the device for extracting the keypoint 100 shown in FIG. 1, but include every remaining components besides the keypoint extraction unit 106 or only a portion of the remaining components. When it is not possible to extract the keypoint, the keypoint extractor 215 may transmit the fact to the image registration unit 213.

The image search unit 217 may search for an image which matches with the image in which the search is requested. Here, the image in which the search is requested may be an image having a keypoint included in the image included in the image search basic information, or a keypoint included in the image search basic information. The image search unit 217 may search for an image which matches with (that is, the same as or similar to) the image in which the search is requested among the images which are previously stored in the database 221. At this time, the image search unit 217 may search for an image based on the keypoint. That is, the image search unit 217 may search for the keypoint which matches with the keypoint extracted from the image included in the image search basic information or the keypoint (hereinafter, it may be referred to as "search request keypoint") included in the image search basic information among the keypoints of the images which are previously registered.

The image search unit 217 may compare a keypoint descriptor of the search request keypoint and each of keypoint descriptors of the keypoints which are previously registered, and extract the keypoints in which the similarity with the search request keypoint among the keypoints which are previously registered is equal to or more than a predetermined threshold value. Here, the similarity between the keypoints may be represented by a sum of a square of a difference (SSD: sum of squared difference) between the keypoint descriptor of the search request keypoint and each of the keypoint descriptors of the keypoints which are previously registered. The SSD may be a type of distance function, and it may represent that the search request keypoint and the predetermined keypoint are similar as a value of the SSD is small.

The image search unit 217 may verify whether the extracted keypoint (that is, the keypoint in which the similarity with the search request keypoint among the keypoints which are previously registered is equal to or more than the predetermined threshold value) matches with the search request keypoint. That is, when extracting the matching keypoint using only the similarity between the keypoints, the keypoint which does not actually match with the search request keypoint may be extracted, and the image search unit 217 may perform an operation of verifying whether the extracted keypoint matches with the search request keypoint. For example, when a integral pattern is included or a similar pattern is repeated in the image, the keypoint which does not actually match with the keypoint may be extracted.

The image search unit 217 may confirm whether a corresponding keypoint actually matches with the search request keypoint using the following Equation 2.

$$\frac{SSD(f1, f2')}{SSD(f1, f2)} \quad \text{[Equation 2]}$$

Here, SSD(f1, f2) may be an SSD between a search request keypoint f1 and a keypoint f2 in which the similarity with the search request keypoint f1 is the greatest, and SSD(f1, f2') may be an SSD between the search request keypoint f1 and a keypoint f2' in which the similarity with the search request keypoint f1 is the second greatest.

The image search unit 217 may confirm whether the corresponding keypoint is a keypoint which actually matches with the search request keypoint according to a value obtained by the Equation 2

$$\left(\text{that is, } \frac{SSD(f1, f2')}{SSD(f1, f2)}\right).$$

Specifically, the image search unit 217 may determine that the keypoint f2 is a keypoint which actually matches with the search request keypoint f1 when the value obtained by the Equation 2 is close to 0, and may determine that the keypoint f2 is a keypoint which does not actually match with the search request keypoint f1 when the value obtained by the Equation 2 is close to 1.

The image search unit 217 may extract a keypoint which matches with the search request keypoint, and extract at least one of the image and the image related information corresponding to the extracted keypoint. The image search unit 217 may transmit at least one of the extracted image and image related information to the user computing devices 202 and 204 transmitting the image search basic information through the communication unit 211.

Further, the image search unit 217 may search for a plurality of images according to the similarity with the image or the keypoint information included in the image search basic information when searching for the image using the image or the keypoint information included in the image search basic information. At this time, the image search unit 217 may classify the searched images into a plurality of groups according to the similarity. For example, the image search unit 217 may classify the corresponding search image into a same image group when the similarity is equal to or more than a first threshold value which is previously set, and classify the corresponding search image into a similar image group when the similarity is equal to or more than a second threshold value which is previously set and is less than the first threshold value. The first threshold value and the second threshold value may be set according to the number of keypoints which matches with the search request keypoint. For example, the first threshold value may be set as a value in which the number of the keypoints which match with the search request keypoint is 100, and the second threshold value may be set as a value in which the number of the keypoints which match with the search request keypoint is 80. Accordingly, when the number of the keypoints which match with the search request keypoint is equal to or more than 100, the image search unit 217 may classify the corresponding image into the same image group. When the number of the keypoints which match with the search request keypoint is equal to or more than 80 and is less than 100, the image search unit 217 may classify the corresponding image into the similar image group.

When transmitting the image and the image related information corresponding to the image search basic information to the user computing devices 202 and 204 through the communication unit 211, the image search unit 217 may also transmit an image (that is, an image which is the same as or similar to the image corresponding to the image search basic information) linked to the image corresponding to the image search basic information and the image related information.

The monitoring unit 219 may monitor at least one among the number of times of search for each period, the number of times of search for each region, the number of times of search for each age, and the total number of times of search with respect to the image which is previously registered. The monitoring unit 219 may monitor the registered image of the corresponding user for each user. The monitoring unit 219 may transmit the monitored result (that is, the search history information) to the user computing devices 202 and 204 registering the corresponding image. The monitoring unit 219 may monitor the image registered as an image for advertisement among the images which are previously registered. When transmitting the image and the image related information corresponding to the image search basic information to the user computing devices 202 and 204, the image search unit 217 may transmit by arranging the corresponding images and the image related information in a descending order according to the number of times of search.

The database 221 may store the image and the image related information determined to be possible to register. The database 221 may store by matching the keypoint information extracted from the image included in the image registration request with the corresponding image and the image related information. The database 221 may store harmful contents information. The database 221 may store the search history information.

Figure 11:
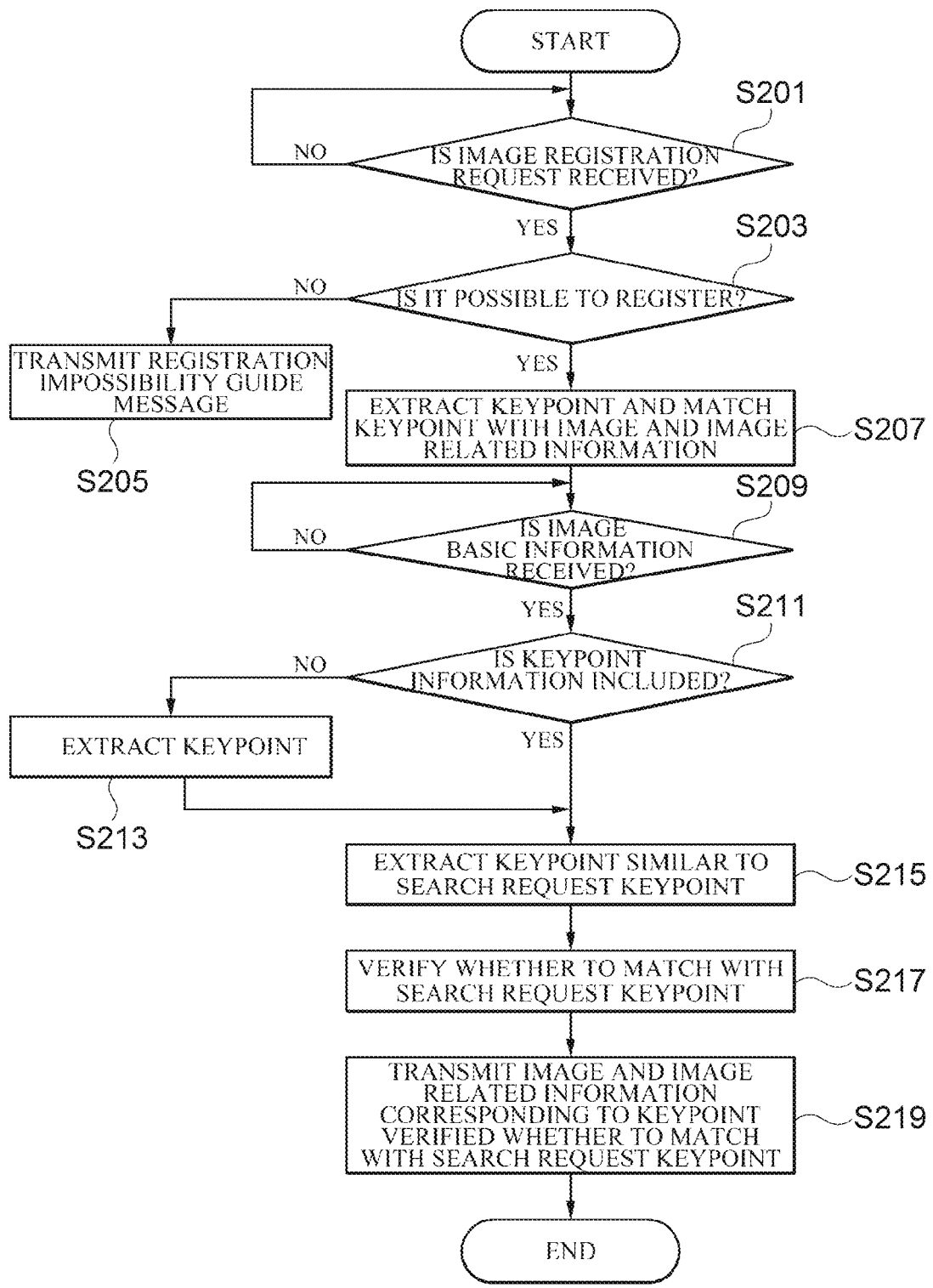
FIG. 11 is a flowchart for describing an image search method based on a keypoint according to an exemplary embodiment of the present invention.

FIG. 11 is a flowchart for describing an image search method based on a keypoint according to an exemplary embodiment of the present invention.

Referring to FIG. 11, the server computing device 206 may confirm whether the image registration request is transmitted from the user computing devices 202 and 204 (S201). The image registration request may include the predetermined image and the image related information.

When the image registration request is transmitted from the user computing devices 202 and 204 based on the confirmation result of the operation S201, the server computing device 206 may determine whether the image registration request is possible to register (S203). The server computing device 206 may determine whether the image registration request is possible to register based on whether the image registration request corresponds to the registration impossibility reasons which are previously set.

When it is determined that the image registration request is not possible to register based on the determination result of the operation S203, the server computing device 206 may transmit registration impossibility guide message to the user computing devices 202 and 204 transmitting the image registration request (S205). The server computing device 206 may determine that the image registration request is not possible to register when the image and the image related information included in the image registration request is the same as or similar to harmful contents information or it is not possible to extract the keypoint from the image included in the image registration request.

When it is determined that the image registration request is possible to register based on the determination result of the operation S203, the server computing device 206 may extract the keypoint from the image included in the image registration request, and perform the image registration operation by matching the extracted keypoint information with the corresponding image and the image related information (S207).

Next, the server computing device 206 may confirm whether the image search basic information is received from the user computing devices 202 and 204 (S209). The image search basic information may include at least one of a predetermined image, the keypoint information extracted from the image, and the image search condition.

When it is determined that the image search basic information is received from the user computing devices 202 and 204 based on the confirmation result of the operation S209, the server computing device 206 may confirm whether the keypoint information is included in the image search basic information (S211).

When it is determined that the keypoint information is not included in the image search basic information based on the confirmation result of the operation (S211), the server computing device 206 may extract the keypoint from the image included in the image search basic information (S213).

When it is determined that the keypoint information is included in the image search basic information based on the confirmation result of the operation S211, the server computing device 206 may extract the keypoint similar to the search request keypoint among the keypoints of the images which are previously registered (S215). Here, the search request keypoint may be the keypoint extracted from the image included in the image search basic information or the keypoint included in the image search basic information. Particularly, the server computing device 206 may compare the keypoint descriptor of the search request keypoint and each of the keypoint descriptors of the keypoints which are previously registered, and extract the keypoints in which the similarity with the search request keypoint is equal to or more than the predetermined threshold value among the keypoints which are previously registered.

Next, the server computing device 206 may verify whether the extracted keypoint (that is, the keypoint in which the similarity with the search request keypoint is equal to or more than the predetermined threshold value among the keypoints which are previously registered) matches with the search request keypoint (S217). For example, the server computing device 206 may confirm whether the corresponding keypoint is a keypoint which actually matches with the search request keypoint according to the value obtained by $$\frac{SSD(f1, f2')}{SSD(f1, f2)}.$$

Next, the server computing device 206 may extract at least one of the image and the image related information corresponding to the keypoint determined to match with the search request keypoint, and transmit the at least one of the extracted image and image related information to the user computing devices 202 and 204 transmitting the image search basic information (S219).

Figure 12:
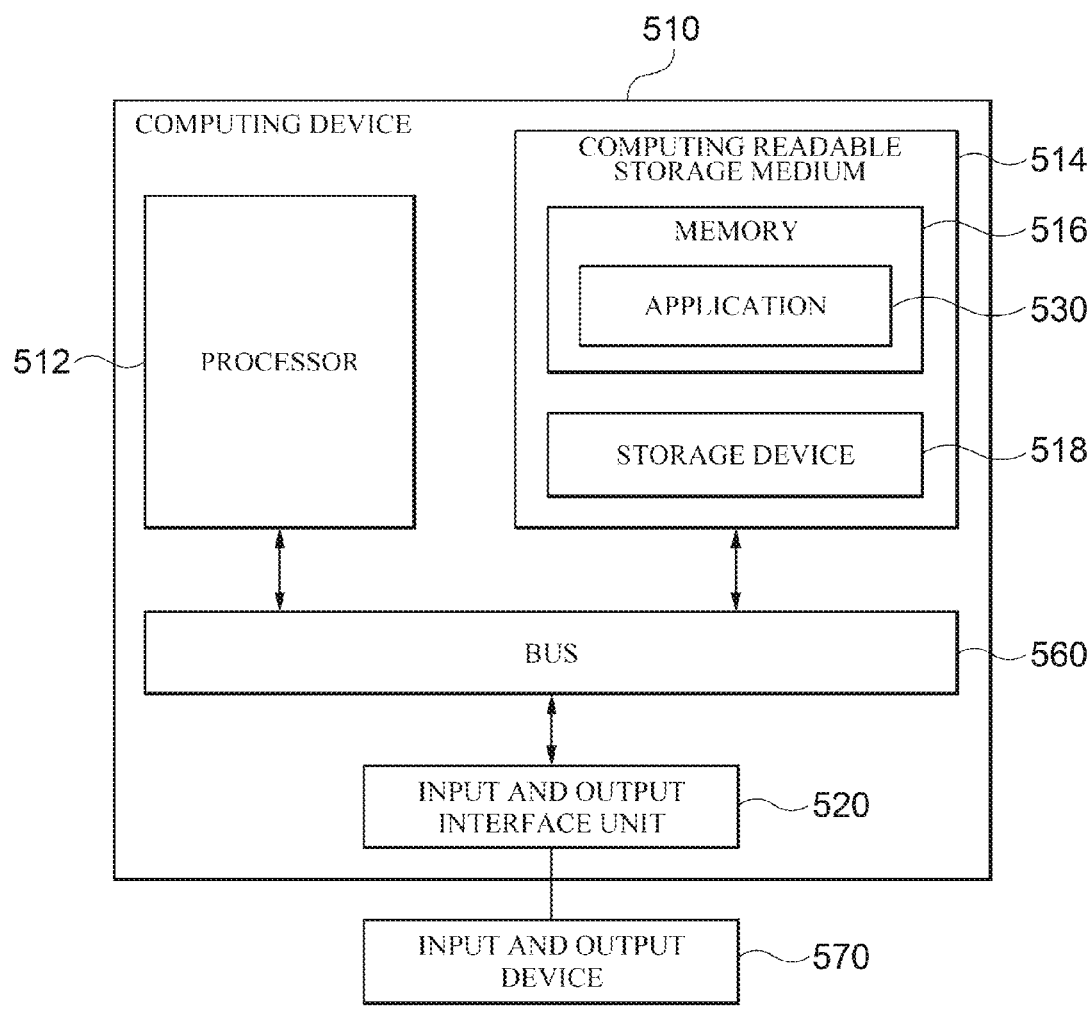
FIG. 12 is a diagram illustrating a computing environment including a computing device which is suitable to use for exemplary embodiments of the present invention.

FIG. 12 is a diagram illustrating a computing environment including a computing device which is suitable to use for exemplary embodiments of the present invention.

The computing environment 500 shown in FIG. 12 may include a computing device 510. In various implementation examples, the computing device 510 may have a configuration for users of the user computing devices 202 and 204 and an operator of the server computing device 206. Further, even though not described hereinafter, a component suitable for the configuration may be further included. Accordingly, the computing device 510 may be a server computing device (for example, the server computing device 206) such as a server computer, a desktop computer, a network computer, a general or special purpose machine, or various types of computing devices, of a service provider. Further, the computing device 510 may be a computing device (for example, the user computing devices 202 and 204) associated with a user such as a mobile phone, a smart phone, a portable media player, a portable game device, a personal digital assistant (PDA), a tablet PC, a laptop computer, and a desktop computer. Further, the device for extracting the keypoint 100 may have the same configuration as the computing environment 500.

The computing device 510 may include at least one processor 512, a computing readable storage medium 514, and a bus 560. The processor 512 may be connected to the bus 560, and the bus 560 may connect the computing readable storage medium 514 and various components of the computing device 510 to the processor 512.

The processor 512 may control the computing device 510 to operate according to exemplary embodiments described above. For example, the processor 512 may execute a computer executable instruction stored in the computing readable storage medium 514, and when the computer executable instruction stored in the computing readable storage medium 514 is executed by the processor 512, the processor 512 may be configured so that the computing device 510 performs operations according to a predetermined exemplary embodiment.

The computing readable storage medium 514 may be configured to store a computer executable instruction or program code (for example, an instruction included in an application 530), program data (for example, data used by the application 530), and/or other suitable types of information. The application 530 stored in the computing readable storage medium 514 may include a predetermined set of instructions which is executable by the processor 512.

A memory 516 and a storage device 518 shown in FIG. 12 may be examples of the computing readable storage medium 514. The computer executable instruction which is executable by the processor 512 may be loaded in the memory 516.

Further, the program data may be stored in the memory 516. For example, the memory 516 may be a volatile memory such as a random access memory, a non-volatile memory, or a suitable combination thereof. As another embodiment, the storage device 518 may include at least one detachable or non-detachable component for storing information. For example, the storage device 518 may be a hard disk, a flash memory, a magnetic disk, an optical disc, other types of storage medium which is accessed by the computing device 510 and can store desired information, or a combination thereof.

The computing device 510 may include at least one input and output interface unit 520 providing an interface for at least one input and output device 570. The input and output interface unit 520 may be connected to the bus 560. The input and output device 570 may be connected to (other components of) the computing device 510 through the input and output interface unit 520. The input and output device 570 may include an input device such as a pointing device, a keyboard, a touch input device, a voice input device, a sensor device, and/or a capturing device, and/or an output device such as a display device, a printer, a speaker, and/or a network card.

Meanwhile, an embodiment of the present invention may include a computer readable storage medium including a program for executing the operation described in this specification on a computer. The computer readable storage medium may include a program instruction, a local data file, a local data structure, etc., alone or in combination. The computer readable storage medium may be specially designed and configured for the present invention. Examples of the computer readable storage medium may include a magnetic medium such as a hard disk, a floppy disk, and a magnetic tape, an optical record medium such as a compact disc-read only memory (CD-ROM) and a digital versatile disc (DVD), a magnetic-optical medium such as a floptical disk, and a hardware device, which is specially configured to store and execute the program instructions, such as a ROM, a RAM, a flash memory, etc. Examples of the program instructions may include mechanical codes which are made by a compiler, and high-level language codes which are executable by a computer using an interpreter, etc.

According to exemplary embodiments, the keypoint which is robust to the illumination change may be extracted by extending the dynamic range of each color channel adaptively according to the channel rate of each color channel and performing the preprocessing operation of converting the space of the input image from the color image space to the gray scale image space. Further, unnecessary keypoints can be removed while securing the number of the keypoints extracted from the input image properly by performing the preprocessing operation of normalizing the size of the input image as the predetermined size. Moreover, a portion capable of being the keypoint can be preserved while removing the speckles or noise present in the input image by filtering the input image using the low pass filter and applying the high frequency compensation filtering method.

Further, the keypoint which is robust to the size change and time change, etc. may be extracted by applying each window to the input image and extracting the keypoint candidate region after generating the window as various sizes. At this time, the increase of the computational amount can be prevented and a fast computation can be performed even when the size of the filter (the window) is increased by applying the normalization filter having the integer coefficient to the integral image of the input image. Moreover, the same keypoint can be described in the corresponding image even when the image is rotated by arranging the main direction of the keypoint in the predetermined direction and generating the relation information between the keypoint and the pixel adjacent to the keypoint.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A keypoint extraction device for extracting a keypoint which is robust to image change, comprising:
   a hardware processor and a memory storing instructions executed by the processor,
   wherein the instructions are configured to be executed by the hardware processor, the instructions comprise:
   a keypoint extractor configured to extract a corner region in an image as a keypoint candidate region, and extract the keypoint from the keypoint candidate region; and
   a keypoint postprocessor configured to generate a keypoint descriptor with respect to the extracted keypoint;
   wherein the extracting of the corner region in the image as the keypoint candidate region, comprise: calculating a difference between an average value of pixel values in a window before the window is moved in the image and an average value of the pixel values in the window after the window is moved in the image, in the keypoint extraction device; and determining the corner region using a change amount of the average value in a direction in which the difference of the average value is the greatest and a change amount of the average value in a direction in which the difference of the average value is the smallest, in the keypoint extraction device.

2. The keypoint extraction device of claim 1, wherein the determining of the corner region, comprises: determining that a corresponding region in the image is the corner region when the change amount of the average value in the direction in which the difference of the average value is the greatest and the change amount of the average value in the direction in which the difference of the average value is the smallest are more than a predetermined threshold value, respectively, in the keypoint extraction device.

3. The keypoint extraction device of claim 1, wherein the keypoint extractor extracts the keypoint candidate region by applying a filter to the image while maintaining a size of the image equally and changing a size of the filter.

4. The keypoint extraction device of claim 3, wherein the keypoint extractor converts the filter having a real number coefficient to a normalization filter having an integer coefficient, and extracts the keypoint candidate region by applying the normalization filter to an integral image of the image while changing a size of the normalization filter.

5. The keypoint extraction device of claim 3, wherein the extracting of the corner region in the image as the keypoint candidate region, comprises: detecting the keypoint candidate region by applying a filter having a first size to the image, in the keypoint extraction device; and finally determining that the detected keypoint candidate region is the keypoint candidate region by comparing an image in which the filter having the first size is applied to the image, and an image in which a filter having a second size smaller than the first size is applied to the image and an image in which a filter having a third size greater than the first size is applied to the image, in the keypoint extraction device.

6. The keypoint extraction device of claim 1, wherein the keypoint postprocessor arranges a main direction of the keypoint in a predetermined direction, and generates a keypoint descriptor including relation information between the keypoint and a pixel adjacent to the keypoint.

7. The keypoint extraction device of claim 1, wherein the keypoint extractor extracts the keypoint candidate region by applying a filter to the image while maintaining a size of the filter equally and changing a size of the image.

8. The keypoint extraction device of claim 1, further comprising, when the image is a color image, an image preprocessor configured to perform an illumination compensation operation on the color image.

9. The keypoint extraction device of claim 8, wherein the image preprocessor adaptively extends a dynamic range of each color channel according to a channel rate of color channels in the color image.

10. The keypoint extraction device of claim 9, wherein the image preprocessor moves a pixel of each color channel by an movement parameter $\beta$ while extending the dynamic range of each color channel by an extension parameter $\alpha$ after calculating the extension parameter $\alpha$ and the movement parameter $\beta$ with respect to a color channel in which a channel rate is the greatest in the color image.

11. The keypoint extraction device of claim 1, further comprising:
when the image is a color image, an image preprocessor configured to convert a space of the image from a color space to a gray scale space.

12. The keypoint extraction device of claim 1, further comprising:
an image preprocessor configured to normalize the image as a predetermined size.

13. The keypoint extraction device of claim 1, further comprising:
a filtering unit configured to filter the image using a low pass filter, and transmit the filtered image to the keypoint extractor,
wherein the filtering unit applies a high frequency compensation filtering method so as to preserve the corner region in the image.

14. The keypoint extraction device of claim 1, further comprising:
a keypoint search unit configured to search for a keypoint which matches with a first keypoint among keypoints which are previously stored.

15. The keypoint extraction device of claim 14, wherein the keypoint search unit compares a keypoint descriptor of the first keypoint and each of keypoint descriptors of the keypoints which are previously stored, and extracts the keypoints in which similarity with the first keypoint is equal to or more than a predetermined threshold value among the keypoints which are previously stored.

16. The keypoint extraction device of claim 15, wherein the keypoint search unit verifies whether the extracted keypoint matches with the first keypoint using the following Equation 1, $$\frac{SSD(f1, f2')}{SSD(f1, f2)} \quad \text{[Equation 1]}$$

here, SSD(f1, f2) is a sum of squared difference (SSD) between a search request keypoint f1 and a keypoint f2 in which the similarity with the search request keypoint f1 is the greatest, and SSD(f1, f2') is an SSD between the search request keypoint f1 and a keypoint f2' in which the similarity with the keypoint f1 is the second greatest.

17. A keypoint extraction method of extracting a keypoint which is robust to image change, comprising:
at a computing device having a hardware processor and memory storing one or more programs for execution by the hardware processor:
extracting a corner region in an image as a keypoint candidate region, in the computing device; and
generating a keypoint descriptor with respect to the keypoint extracted in the keypoint candidate region, in the computing device;
wherein the extracting of the corner region in the image as the keypoint candidate region, comprises:
calculating a difference between an average value of pixel values in a window before the window is moved in the image and an average value of the pixel values in the window after the window is moved in the image, in the computing device; and determining the corner region using a change amount of the average value in a direction in which the difference of the average value is the greatest and a change amount of the average value in a direction in which the difference of the average value is the smallest, in the computing device.

18. The keypoint extraction method of claim 17, wherein the determining of the corner region, comprises:
determining that a corresponding region in the image is the corner region when the change amount of the average value in the direction in which the difference of the average value is the greatest and the change amount of the average value in the direction in which the difference of the average value is the smallest are more than a predetermined threshold value, respectively, in the computing device.

19. The keypoint extraction method of claim 17, wherein the extracting of the corner region in the image as the keypoint candidate region, comprises:
extracting the keypoint candidate region by applying a filter to the image while maintaining a size of the image equally and changing a size of the filter, in the computing device.

20. The keypoint extraction method of claim 19, wherein the extracting of the corner region in the image as the keypoint candidate region, comprises:
converting the filter having a real number coefficient to a normalization filter having an integer coefficient, in the computing device; and
extracting the keypoint candidate region by applying the normalization filter to an integral image of the image while changing a size of the normalization filter, in the computing device.

21. The keypoint extraction method of claim 19, wherein the extracting of the corner region in the image as the keypoint candidate region, comprises:
detecting the keypoint candidate region by applying a filter having a first size to the image, in the computing device; and finally determining that the detected keypoint candidate region is the keypoint candidate region by comparing an image in which the filter having the first size is applied to the image, and an image in which a filter having a second size smaller than the first size is applied to the image and an image in which a filter having a third size greater than the first size is applied to the image, in the computing device.

22. The keypoint extraction method of claim 17, wherein the generating of the keypoint descriptor, comprises:

setting a main direction of the keypoint as a predetermined direction, and generating a keypoint descriptor including relation information between the keypoint and a pixel adjacent to the keypoint, in the computing device.

23. The keypoint extraction method of claim 17, wherein the extracting of the corner region in the image as the keypoint candidate region, comprises:

extracting the keypoint candidate region by applying a filter to the image while maintaining a size of the filter equally and changing a size of the image, in the computing device.

24. The keypoint extraction method of claim 17, further comprising, when the image is a color image, before the extracting of the corner region in the image as the keypoint candidate region, performing an illumination compensation operation on the color image by adaptively extending a dynamic range of each color channel according to a channel rate of color channels in the color image, in the computing device.

25. The keypoint extraction method of claim 24, wherein the performing of the illumination compensation operation, comprises:

calculating an extension parameter $\alpha$ and a movement parameter $\beta$ with respect to a color channel in which the channel rate is the greatest in the color image, in the computing device; and moving a pixel of each color channel by the movement parameter $\beta$ while extending the dynamic range of each color channel by the extension parameter $\alpha$, in the computing device.

26. The keypoint extraction method of claim 17, further comprising, when the image is a color image, before the extracting of the corner region in the image as the keypoint candidate region, converting a space of the image from a color space to a gray scale space, in the computing device.

27. The keypoint extraction method of claim 17, further comprising, before the extracting of the corner region in the image as the keypoint candidate region, normalizing the image as a predetermined size, in the computing device.

28. An image matching system for analyzing an online distribution situation of contents, comprising:

a server computing device configured to extract a corner region in an image as a keypoint candidate region, and extract and store a keypoint in the keypoint candidate region; and a user computing device configured to transmit image search basic information including the image or the keypoint extracted from the image, wherein the server computing device searches for a keypoint which matches with a search request keypoint obtained from the image search basic information among keypoints which are previously stored, and monitors the number of times of search of images corresponding to the keypoint which is previously stored, and calculates a difference between an average value of pixel values in a window before the window is moved in the image and an average value of the pixel values in the window after the window is moved in the image, and determines the corner region using a change amount of the average value in a direction in which the difference of the average value is the greatest and a change amount of the average value in a direction in which the difference of the average value is the smallest.

29. A non-transitory computer readable storage medium coupled to hardware and in which an instruction is stored, performing operations of:

extracting a corner region in an image as a keypoint candidate region of the image by a processor when the instruction is performed by the processor of a computing device; and generating a keypoint descriptor with respect to a keypoint extracted in the keypoint candidate region by the processor;

wherein the extracting of the corner region in the image as the keypoint candidate region, comprises:

calculating a difference between an average value of pixel values in a window before the window is moved in the image and an average value of the pixel values in the window after the window is moved in the image; and determining the corner region using a change amount of the average value in a direction in which the difference of the average value is the greatest and a change amount of the average value in a direction in which the difference of the average value is the smallest.

* * * * *